(12) United States Patent
Braness et al.

(10) Patent No.: US 11,115,450 B2
(45) Date of Patent: *Sep. 7, 2021

(54) SYSTEMS, METHODS, AND MEDIA FOR PLAYING BACK PROTECTED VIDEO CONTENT BY USING TOP LEVEL INDEX FILE

(71) Applicant: DIVX, LLC, San Diego, CA (US)

(72) Inventors: Jason Braness, San Diego, CA (US); Evan Wallin, San Diego, CA (US); Ederson Ferreira, Campinas (BR)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,668

(22) Filed: Dec. 4, 2019

(65) Prior Publication Data
US 2020/0106820 A1   Apr. 2, 2020

Related U.S. Application Data

(63) Continuation of application No. 16/207,405, filed on Dec. 3, 2018, now Pat. No. 10,542,061, which is a
(Continued)

(51) Int. Cl.
*H04L 29/06* (2006.01)
*H04N 21/239* (2011.01)
(Continued)

(52) U.S. Cl.
CPC ............ *H04L 65/602* (2013.01); *G06F 21/10* (2013.01); *H04L 63/0428* (2013.01);
(Continued)

(58) Field of Classification Search
CPC ............... H04L 65/602; H04L 63/0428; H04L 63/4069; H04L 63/60; G06F 21/10
(Continued)

(56) References Cited

U.S. PATENT DOCUMENTS 3,609,227 A   9/1971   Kuljian
4,694,491 A   9/1987   Horne et al.
(Continued)

FOREIGN PATENT DOCUMENTS

CA   2237293 A1   7/1997
CN   101861583 A   10/2010
(Continued)

OTHER PUBLICATIONS

Shah et al., "Localising Peers in P2P Live Streaming Systems Within Resource-Constrained Networks", 2012 International Conference on Computer&Information Science (ICCIS), Year. 2012, https://ieeexplore.ieee.org/stamp/stamp.jsp?tp=arnumber=6297115, 6 pgs.
(Continued)

*Primary Examiner* — Dant B Shaifer Harriman
(74) *Attorney, Agent, or Firm* — KPPB LLP

(57) ABSTRACT

Systems and methods for automatically generating top level index files for use in adaptive bitrate streaming in accordance with embodiments of the invention are disclosed. One embodiment of the method of the invention includes receiving a request from a playback device at a playback server, where the request identifies a piece of content, retrieving a list of assets associated with the identified piece of content using the playback server, filtering the list of assets using at least one predetermined criterion using the playback server, generating a top level index file describing each asset in the filtered list of assets using the playback server, and sending the top level index file to the playback device using the playback server.

30 Claims, 9 Drawing Sheets

Related U.S. Application Data continuation of application No. 15/658,057, filed on Jul. 24, 2017, now Pat. No. 10,154,075, which is a continuation of application No. 15/009,593, filed on Jan. 28, 2016, now Pat. No. 9,998,515, which is a continuation of application No. 14/336,392, filed on Jul. 21, 2014, now Pat. No. 9,270,720, which is a continuation of application No. 13/341,789, filed on Dec. 30, 2011, now Pat. No. 8,787,570.

(60) Provisional application No. 61/529,403, filed on Aug. 31, 2011.

(51) Int. Cl.

| | |
|---|---|
| *H04N 21/258* | (2011.01) |
| *H04N 21/472* | (2011.01) |
| *H04N 21/658* | (2011.01) |
| *H04N 21/8352* | (2011.01) |
| *H04N 21/262* | (2011.01) |
| *G06F 21/10* | (2013.01) |
| *H04L 29/08* | (2006.01) |
| *H04N 21/2385* | (2011.01) |
| *H04N 21/254* | (2011.01) |

(52) U.S. Cl.
CPC .......... *H04L 65/4069* (2013.01); *H04L 65/60* (2013.01); *H04L 67/06* (2013.01); *H04N 21/2385* (2013.01); *H04N 21/2393* (2013.01); *H04N 21/2541* (2013.01); *H04N 21/25825* (2013.01); *H04N 21/25841* (2013.01); *H04N 21/26258* (2013.01); *H04N 21/47202* (2013.01); *H04N 21/6581* (2013.01); *H04N 21/8352* (2013.01)

(58) Field of Classification Search
USPC ....................................................... 709/219
See application file for complete search history.

(56) References Cited

U.S. PATENT DOCUMENTS

| | | | |
|---|---|---|---|
| 5,132,992 A | 7/1992 | Yurt et al. | |
| 5,341,474 A | 8/1994 | Gelman et al. | |
| 5,400,401 A | 3/1995 | Wasilewski et al. | |
| 5,477,263 A | 12/1995 | Ocallaghan et al. | |
| 5,544,318 A | 8/1996 | Schmitz et al. | |
| 5,550,863 A | 8/1996 | Yurt et al. | |
| 5,574,785 A | 11/1996 | Ueno et al. | |
| 5,600,721 A | 2/1997 | Kitazato | |
| 5,614,940 A | 3/1997 | Cobbley et al. | |
| 5,621,794 A | 4/1997 | Matsuda et al. | |
| 5,630,005 A | 5/1997 | Ort | |
| 5,642,338 A | 6/1997 | Fukushima et al. | |
| 5,761,417 A | 6/1998 | Henley et al. | |
| 5,805,700 A | 9/1998 | Nardone et al. | |
| 5,813,010 A | 9/1998 | Kurano et al. | |
| 5,828,370 A | 10/1998 | Moeller et al. | |
| 5,838,791 A | 11/1998 | Torii et al. | |
| 5,852,664 A | 12/1998 | Iverson et al. | |
| 5,854,873 A | 12/1998 | Mori et al. | |
| 5,874,986 A | 2/1999 | Gibbon et al. | |
| 5,878,135 A | 3/1999 | Blatter et al. | |
| 5,892,915 A | 4/1999 | Duso et al. | |
| 5,907,658 A | 5/1999 | Murase et al. | |
| 5,923,869 A | 7/1999 | Kashiwagi et al. | |
| 5,973,679 A | 10/1999 | Abbott et al. | |
| 6,002,834 A | 12/1999 | Hirabayashi et al. | |
| 6,009,237 A | 12/1999 | Hirabayashi et al. | |
| 6,016,381 A | 1/2000 | Taira et al. | |
| 6,038,316 A | 3/2000 | Dwork et al. | |
| 6,057,832 A | 5/2000 | Lev et al. | |
| 6,065,050 A | 5/2000 | DeMoney | |
| 6,108,422 A | 8/2000 | Newby et al. | |
| 6,151,634 A | 11/2000 | Glaser et al. | |
| 6,154,172 A | 11/2000 | Piccionelli et al. | |
| 6,154,173 A | 11/2000 | Lennen et al. | |
| 6,199,107 B1 | 3/2001 | Dujari | |
| 6,226,618 B1* | 5/2001 | Downs | G06F 21/10 705/51 |
| 6,263,313 B1* | 7/2001 | Milsted | G06F 21/10 705/50 |
| 6,266,483 B1 | 7/2001 | Okada et al. | |
| 6,282,320 B1 | 8/2001 | Hasegawa et al. | |
| 6,320,905 B1 | 11/2001 | Konstantinides | |
| 6,347,145 B2 | 2/2002 | Kato et al. | |
| 6,351,538 B1 | 2/2002 | Uz | |
| 6,373,803 B2 | 4/2002 | Ando et al. | |
| 6,389,473 B1 | 5/2002 | Carmel et al. | |
| 6,389,538 B1* | 5/2002 | Gruse | G06F 21/10 713/194 |
| 6,398,245 B1* | 6/2002 | Gruse | G06F 21/10 280/228 |
| 6,415,031 B1 | 7/2002 | Colligan et al. | |
| 6,445,877 B1 | 9/2002 | Okada et al. | |
| 6,453,115 B1 | 9/2002 | Boyle | |
| 6,453,116 B1 | 9/2002 | Ando et al. | |
| 6,504,873 B1 | 1/2003 | Vehvilaeinen | |
| 6,512,883 B2 | 1/2003 | Shim et al. | |
| 6,516,064 B1 | 2/2003 | Osawa et al. | |
| 6,535,920 B1 | 3/2003 | Parry et al. | |
| 6,578,200 B1 | 6/2003 | Takao et al. | |
| 6,587,837 B1* | 7/2003 | Spagna | G06F 21/10 705/52 |
| 6,594,699 B1 | 7/2003 | Sahai et al. | |
| 6,654,933 B1 | 11/2003 | Abbott et al. | |
| 6,671,408 B1 | 12/2003 | Kaku | |
| 6,690,838 B2 | 2/2004 | Zhou | |
| 6,721,794 B2 | 4/2004 | Taylor et al. | |
| 6,724,944 B1 | 4/2004 | Kalevo et al. | |
| 6,741,252 B2 | 5/2004 | Hijiri et al. | |
| 6,742,082 B1 | 5/2004 | Lango et al. | |
| 6,751,623 B1 | 6/2004 | Basso et al. | |
| 6,810,131 B2 | 10/2004 | Nakagawa et al. | |
| 6,813,437 B2 | 11/2004 | Ando et al. | |
| 6,859,791 B1* | 2/2005 | Spagna | G06F 21/10 705/51 |
| 6,868,143 B1 | 3/2005 | Menon et al. | |
| 6,871,006 B1 | 3/2005 | Oguz et al. | |
| 6,912,513 B1 | 6/2005 | Candelore | |
| 6,931,531 B1 | 8/2005 | Takahashi | |
| 6,931,543 B1 | 8/2005 | Pang et al. | |
| 6,957,350 B1 | 10/2005 | Demos | |
| 6,959,288 B1* | 10/2005 | Medina | G06Q 20/3829 705/51 |
| 6,965,646 B1 | 11/2005 | Firestone | |
| 6,970,564 B1 | 11/2005 | Kubota et al. | |
| 6,983,079 B2 | 1/2006 | Kim | |
| 7,006,757 B2 | 2/2006 | Ando et al. | |
| 7,007,170 B2 | 2/2006 | Morten | |
| 7,020,287 B2 | 3/2006 | Unger | |
| 7,023,992 B1 | 4/2006 | Kubota et al. | |
| 7,043,021 B2 | 5/2006 | Graunke et al. | |
| 7,051,110 B2 | 5/2006 | Hagai et al. | |
| 7,058,177 B1 | 6/2006 | Trimberger et al. | |
| 7,073,191 B2 | 7/2006 | Srikantan et al. | |
| 7,103,906 B1 | 9/2006 | Katz et al. | |
| 7,110,542 B1 | 9/2006 | Tripathy | |
| 7,120,250 B2 | 10/2006 | Candelore | |
| 7,124,303 B2 | 10/2006 | Candelore et al. | |
| 7,139,868 B2 | 11/2006 | Parry et al. | |
| 7,143,289 B2 | 11/2006 | Denning et al. | |
| 7,151,832 B1 | 12/2006 | Fetkovich et al. | |
| 7,167,560 B2 | 1/2007 | Yu | |
| 7,177,818 B2 | 2/2007 | Nair | |
| 7,188,183 B1 | 3/2007 | Paul et al. | |
| 7,203,313 B2 | 4/2007 | England et al. | |
| 7,212,726 B2 | 5/2007 | Zetts | |
| 7,231,516 B1 | 6/2007 | Sparrell et al. | |
| 7,233,669 B2 | 6/2007 | Candelore | |
| 7,233,948 B1 | 6/2007 | Shamoon et al. | |
| 7,242,772 B1 | 7/2007 | Tehranchi | |

(56) References Cited

U.S. PATENT DOCUMENTS

| | | | |
|---|---|---|---|
| 7,274,861 B2 | 9/2007 | Yahata et al. |
| 7,295,673 B2 | 11/2007 | Grab et al. |
| 7,295,752 B1 | 11/2007 | Jain et al. |
| 7,302,490 B1 | 11/2007 | Gupta et al. |
| 7,315,829 B1 | 1/2008 | Tagawa et al. |
| 7,346,163 B2 | 3/2008 | Pedlow, Jr. et al. |
| 7,349,886 B2 | 3/2008 | Morten et al. |
| 7,349,976 B1 | 3/2008 | Glaser et al. |
| 7,352,956 B1 | 4/2008 | Winter et al. |
| 7,363,647 B1 | 4/2008 | Fakharzadeh |
| 7,376,233 B2 | 5/2008 | Candelore et al. |
| 7,382,879 B1 | 6/2008 | Miller |
| 7,397,853 B2 | 7/2008 | Kwon et al. |
| 7,400,679 B2 | 7/2008 | Kwon et al. |
| 7,406,176 B2 | 7/2008 | Zhu et al. |
| 7,418,132 B2 | 8/2008 | Hoshuyama |
| 7,443,449 B2 | 10/2008 | Momosaki et al. |
| 7,457,415 B2 | 11/2008 | Reitmeier et al. |
| 7,499,930 B2 | 3/2009 | Naka et al. |
| 7,539,213 B2 | 5/2009 | Guillemot et al. |
| 7,546,641 B2 | 6/2009 | Robert et al. |
| 7,577,980 B2 | 8/2009 | Kienzle et al. |
| 7,623,759 B2 | 11/2009 | Shimoda |
| 7,624,337 B2 | 11/2009 | Sull et al. |
| 7,627,750 B1 | 12/2009 | Chan |
| 7,627,888 B2 | 12/2009 | Ganesan et al. |
| 7,639,921 B2 | 12/2009 | Seo et al. |
| 7,640,358 B2 | 12/2009 | Deshpande |
| 7,640,435 B2 | 12/2009 | Morten |
| 7,644,172 B2 | 1/2010 | Stewart et al. |
| 7,653,686 B2 | 1/2010 | Yoneda |
| 7,664,262 B2 | 2/2010 | Haruki |
| 7,664,872 B2 | 2/2010 | Osborne et al. |
| 7,697,686 B2 | 4/2010 | Puiatti et al. |
| 7,702,925 B2 | 4/2010 | Hanko et al. |
| 7,711,052 B2 | 5/2010 | Hannuksela et al. |
| 7,734,806 B2 | 6/2010 | Park |
| 7,756,270 B2 | 7/2010 | Shimosato et al. |
| 7,756,271 B2 | 7/2010 | Zhu et al. |
| 7,787,622 B2 | 8/2010 | Sprunk |
| 7,797,720 B2 | 9/2010 | Gopalakrishnan et al. |
| 7,818,444 B2 * | 10/2010 | Brueck ............ H04N 7/24 |
| | | | 709/231 |
| 7,840,693 B2 | 11/2010 | Gupta et al. |
| 7,853,980 B2 | 12/2010 | Pedlow, Jr. et al. |
| 7,864,186 B2 | 1/2011 | Robotham et al. |
| 7,877,002 B2 | 1/2011 | Ikeda et al. |
| 7,881,478 B2 | 2/2011 | Derouet |
| 7,885,405 B1 | 2/2011 | Bong |
| 7,895,311 B1 | 2/2011 | Juenger |
| 7,907,833 B2 | 3/2011 | Lee |
| 7,925,203 B2 | 4/2011 | Lane et al. |
| 7,945,143 B2 | 5/2011 | Yahata et al. |
| 7,962,942 B1 | 6/2011 | Craner |
| 7,970,835 B2 | 6/2011 | St Jacques |
| 7,974,714 B2 | 7/2011 | Hoffberg |
| 8,001,471 B2 | 8/2011 | Shaver et al. |
| 8,015,491 B2 | 9/2011 | Shaver et al. |
| 8,073,900 B2 | 12/2011 | Guedalia et al. |
| 8,074,083 B1 | 12/2011 | Lee et al. |
| 8,078,644 B2 | 12/2011 | Hannuksela |
| 8,131,875 B1 | 3/2012 | Chen |
| 8,135,041 B2 | 3/2012 | Ramaswamy |
| 8,148,622 B2 | 4/2012 | Rothkopf et al. |
| 8,160,157 B2 | 4/2012 | Lamy-Bergot et al. |
| 8,169,916 B1 | 5/2012 | Pai et al. |
| 8,170,210 B2 | 5/2012 | Manders et al. |
| 8,171,518 B2 | 5/2012 | White |
| 8,191,097 B1 | 5/2012 | Armstrong et al. |
| 8,213,607 B2 | 7/2012 | Rose et al. |
| 8,213,768 B2 | 7/2012 | Morioka et al. |
| 8,218,439 B2 | 7/2012 | Deshpande |
| 8,243,924 B2 | 8/2012 | Chen et al. |
| 8,266,115 B1 | 9/2012 | Park et al. |
| 8,286,213 B2 | 10/2012 | Seo |
| 8,290,157 B2 | 10/2012 | Candelore |
| 8,311,094 B2 | 11/2012 | Kamariotis et al. |
| 8,312,079 B2 | 11/2012 | Newsome et al. |
| 8,365,235 B2 | 1/2013 | Hunt et al. |
| 8,369,421 B2 | 2/2013 | Kadono et al. |
| 8,380,041 B2 | 2/2013 | Barton et al. |
| 8,397,265 B2 | 3/2013 | Henocq et al. |
| 8,401,188 B1 | 3/2013 | Swaminathan |
| 8,402,156 B2 * | 3/2013 | Brueck ............ H04L 29/06027 |
| | | | 709/231 |
| 8,407,753 B2 | 3/2013 | Kuo |
| 8,423,889 B1 | 4/2013 | Zagorie et al. |
| 8,472,792 B2 | 6/2013 | Butt et al. |
| 8,514,926 B2 | 8/2013 | Ro et al. |
| 8,526,610 B2 | 9/2013 | Shamoon et al. |
| 8,543,842 B2 | 9/2013 | Ginter et al. |
| 8,555,329 B2 | 10/2013 | Frojdh et al. |
| 8,571,993 B2 | 10/2013 | Kocher et al. |
| 8,630,419 B2 | 1/2014 | Mori |
| 8,631,247 B2 | 1/2014 | O'Loughlin et al. |
| 8,638,935 B2 | 1/2014 | Fasoli et al. |
| 8,649,669 B2 | 2/2014 | Braness et al. |
| 8,650,599 B2 | 2/2014 | Shindo et al. |
| 8,677,428 B2 | 3/2014 | Lewis et al. |
| 8,683,066 B2 | 3/2014 | Hurst et al. |
| 8,725,125 B2 | 5/2014 | Klappert et al. |
| 8,731,193 B2 | 5/2014 | Farkash et al. |
| 8,731,369 B2 | 5/2014 | Li et al. |
| 8,782,268 B2 | 7/2014 | Pyle et al. |
| 8,787,570 B2 | 7/2014 | Braness et al. |
| 8,804,956 B2 | 8/2014 | Hiriart |
| 8,806,188 B2 | 8/2014 | Braness et al. |
| 8,818,896 B2 | 8/2014 | Candelore |
| 8,819,116 B1 | 8/2014 | Tomay et al. |
| 8,819,577 B2 | 8/2014 | Fino |
| 8,849,950 B2 | 9/2014 | Stockhammer et al. |
| 8,850,205 B2 | 9/2014 | Choi et al. |
| 8,850,498 B1 | 9/2014 | Roach et al. |
| 8,856,847 B2 | 10/2014 | Soroushian |
| 8,909,922 B2 | 12/2014 | Kiefer et al. |
| 8,914,534 B2 | 12/2014 | Braness et al. |
| 8,918,533 B2 | 12/2014 | Chen et al. |
| 8,918,535 B2 | 12/2014 | Ma et al. |
| 9,009,491 B2 * | 4/2015 | Resch ................ G06F 11/1004 |
| | | | 713/189 |
| 9,015,782 B2 | 4/2015 | Acharya et al. |
| 9,037,683 B1 | 5/2015 | Yoden |
| 9,038,116 B1 | 5/2015 | Knox et al. |
| 9,038,121 B2 | 5/2015 | Kienzle et al. |
| 9,092,646 B2 | 7/2015 | Grab et al. |
| 9,111,098 B2 | 8/2015 | Smith et al. |
| 9,161,005 B2 | 10/2015 | Rose et al. |
| 9,191,151 B2 | 11/2015 | Luby et al. |
| 9,247,311 B2 | 1/2016 | Kiefer |
| 9,270,720 B2 | 2/2016 | Braness et al. |
| 9,380,096 B2 | 6/2016 | Luby et al. |
| 9,380,099 B2 | 6/2016 | Amidei et al. |
| 9,386,064 B2 | 7/2016 | Luby et al. |
| 9,485,469 B2 | 11/2016 | Kahn et al. |
| 9,507,776 B2 | 11/2016 | Bartholomew |
| 9,615,061 B2 | 4/2017 | Carney et al. |
| 9,628,536 B2 | 4/2017 | Luby et al. |
| 9,661,044 B2 | 5/2017 | Arana et al. |
| 9,674,254 B2 | 6/2017 | Pare et al. |
| 9,761,274 B2 | 9/2017 | Delpuch et al. |
| 9,967,521 B2 | 5/2018 | Kahn et al. |
| 9,998,515 B2 | 6/2018 | Braness et al. |
| 10,154,075 B2 | 12/2018 | Braness et al. |
| 10,171,873 B2 | 1/2019 | Krebs |
| 10,225,298 B2 | 3/2019 | Cen et al. |
| 10,542,061 B2 | 1/2020 | Braness et al. |
| 10,623,458 B2 | 4/2020 | Cen et al. |
| 2001/0021276 A1 | 9/2001 | Zhou |
| 2001/0052077 A1 | 12/2001 | Fung et al. |
| 2001/0052127 A1 | 12/2001 | Seo et al. |
| 2001/0053222 A1 | 12/2001 | Wakao et al. |
| 2002/0048450 A1 | 4/2002 | Zetts |
| 2002/0067432 A1 | 6/2002 | Kondo et al. |
| 2002/0075572 A1 | 6/2002 | Boreczky et al. |

(56) References Cited

U.S. PATENT DOCUMENTS

| | | |
|---|---|---|
| 2002/0107802 A1 | 8/2002 | Philips |
| 2002/0114330 A1 | 8/2002 | Cheung et al. |
| 2002/0135607 A1 | 9/2002 | Kato et al. |
| 2002/0141503 A1 | 10/2002 | Kobayashi et al. |
| 2002/0154779 A1 | 10/2002 | Asano et al. |
| 2002/0161797 A1 | 10/2002 | Gallo et al. |
| 2002/0164024 A1 | 11/2002 | Arakawa et al. |
| 2002/0169926 A1 | 11/2002 | Pinckney et al. |
| 2002/0169971 A1 | 11/2002 | Asano et al. |
| 2003/0002577 A1 | 1/2003 | Pinder |
| 2003/0043847 A1 | 3/2003 | Haddad |
| 2003/0044080 A1 | 3/2003 | Frishman et al. |
| 2003/0051237 A1 | 3/2003 | Sako et al. |
| 2003/0053541 A1 | 3/2003 | Sun et al. |
| 2003/0061369 A1 | 3/2003 | Aksu et al. |
| 2003/0063675 A1 | 4/2003 | Kang et al. |
| 2003/0077071 A1 | 4/2003 | Lin et al. |
| 2003/0078930 A1 | 4/2003 | Surcouf et al. |
| 2003/0079222 A1 | 4/2003 | Boykin et al. |
| 2003/0081776 A1 | 5/2003 | Candelore |
| 2003/0135633 A1 | 7/2003 | Dror et al. |
| 2003/0135742 A1 | 7/2003 | Evans |
| 2003/0142594 A1 | 7/2003 | Tsumagari et al. |
| 2003/0152224 A1 | 8/2003 | Candelore et al. |
| 2003/0206717 A1 | 11/2003 | Yogeshwar et al. |
| 2003/0225696 A1 | 12/2003 | Niwa |
| 2003/0236907 A1 | 12/2003 | Stewart et al. |
| 2004/0001594 A1 | 1/2004 | Krishnaswamy et al. |
| 2004/0003008 A1 | 1/2004 | Wasilewski et al. |
| 2004/0022391 A1 | 2/2004 | Obrien |
| 2004/0028227 A1 | 2/2004 | Yu |
| 2004/0037421 A1 | 2/2004 | Truman |
| 2004/0047592 A1 | 3/2004 | Seo et al. |
| 2004/0047607 A1 | 3/2004 | Seo et al. |
| 2004/0049690 A1 | 3/2004 | Candelore et al. |
| 2004/0049694 A1 | 3/2004 | Candelore |
| 2004/0073917 A1 | 4/2004 | Pedlow et al. |
| 2004/0076237 A1 | 4/2004 | Kadono et al. |
| 2004/0081333 A1 | 4/2004 | Grab et al. |
| 2004/0088557 A1 | 5/2004 | Malcolm et al. |
| 2004/0093494 A1 | 5/2004 | Nishimoto et al. |
| 2004/0101059 A1 | 5/2004 | Joch et al. |
| 2004/0101142 A1 | 5/2004 | Nasypny |
| 2004/0107356 A1 | 6/2004 | Shamoon et al. |
| 2004/0213094 A1 | 10/2004 | Suzuki |
| 2004/0243714 A1 | 12/2004 | Wynn et al. |
| 2004/0267952 A1 | 12/2004 | He et al. |
| 2005/0005025 A1 | 1/2005 | Harville et al. |
| 2005/0005143 A1 | 1/2005 | Lang et al. |
| 2005/0013494 A1 | 1/2005 | Srinivasan et al. |
| 2005/0063541 A1 | 3/2005 | Candelore |
| 2005/0066063 A1 | 3/2005 | Grigorovitch et al. |
| 2005/0076232 A1 | 4/2005 | Kawaguchi |
| 2005/0102371 A1 | 5/2005 | Aksu |
| 2005/0120132 A1 | 6/2005 | Hutter |
| 2005/0138655 A1 | 6/2005 | Zimler et al. |
| 2005/0144468 A1 | 6/2005 | Northcutt |
| 2005/0177741 A1 | 8/2005 | Chen et al. |
| 2005/0190911 A1 | 9/2005 | Pare et al. |
| 2005/0192904 A1 | 9/2005 | Candelore |
| 2005/0195975 A1 | 9/2005 | Kawakita |
| 2005/0198364 A1 | 9/2005 | Vai et al. |
| 2005/0207442 A1 | 9/2005 | Zoest et al. |
| 2005/0207578 A1 | 9/2005 | Matsuyama et al. |
| 2005/0216752 A1 | 9/2005 | Hofmeyr et al. |
| 2005/0227773 A1 | 10/2005 | Lu et al. |
| 2005/0243912 A1 | 11/2005 | Kwon et al. |
| 2005/0262257 A1 | 11/2005 | Major et al. |
| 2005/0265555 A1 | 12/2005 | Pippuri |
| 2006/0013568 A1 | 1/2006 | Rodriguez |
| 2006/0015580 A1 | 1/2006 | Gabriel et al. |
| 2006/0026654 A1 | 2/2006 | An et al. |
| 2006/0037057 A1 | 2/2006 | Xu |
| 2006/0093318 A1 | 5/2006 | Cohen et al. |
| 2006/0095472 A1 | 5/2006 | Krikorian et al. |
| 2006/0109856 A1 | 5/2006 | Deshpande |
| 2006/0129909 A1 | 6/2006 | Butt et al. |
| 2006/0165163 A1 | 7/2006 | Burazerovic et al. |
| 2006/0168298 A1 | 7/2006 | Aoki et al. |
| 2006/0210245 A1 | 9/2006 | Mccrossan et al. |
| 2006/0212370 A1 | 9/2006 | Shear et al. |
| 2006/0218251 A1 | 9/2006 | Tanabe |
| 2006/0235883 A1 | 10/2006 | Krebs |
| 2007/0044010 A1 | 2/2007 | Sull et al. |
| 2007/0047645 A1 | 3/2007 | Takashima |
| 2007/0055982 A1 | 3/2007 | Spilo |
| 2007/0067472 A1 | 3/2007 | Maertens et al. |
| 2007/0074254 A1 | 3/2007 | Sloo |
| 2007/0083467 A1 | 4/2007 | Lindahl et al. |
| 2007/0106863 A1 | 5/2007 | Bonwick et al. |
| 2007/0157267 A1 | 7/2007 | Lopez-Estrada |
| 2007/0162568 A1 | 7/2007 | Gupta et al. |
| 2007/0162981 A1 | 7/2007 | Morioka et al. |
| 2007/0166000 A1 | 7/2007 | Nallur et al. |
| 2007/0180051 A1 | 8/2007 | Kelly et al. |
| 2007/0201502 A1 | 8/2007 | Abramson |
| 2007/0204003 A1 | 8/2007 | Abramson |
| 2007/0204011 A1 | 8/2007 | Shaver et al. |
| 2007/0204115 A1 | 8/2007 | Abramson |
| 2007/0220118 A1 | 9/2007 | Loyer |
| 2007/0250536 A1 | 10/2007 | Tanaka et al. |
| 2008/0008455 A1 | 1/2008 | De Lange et al. |
| 2008/0022005 A1 | 1/2008 | Wu et al. |
| 2008/0040239 A1 | 2/2008 | Jacobi et al. |
| 2008/0086570 A1 | 4/2008 | Dey et al. |
| 2008/0101718 A1 | 5/2008 | Yang et al. |
| 2008/0137847 A1 | 6/2008 | Candelore et al. |
| 2008/0155615 A1 | 6/2008 | Craner et al. |
| 2008/0160911 A1 | 7/2008 | Chou et al. |
| 2008/0168516 A1 | 7/2008 | Flick et al. |
| 2008/0177793 A1 | 7/2008 | Epstein et al. |
| 2008/0282302 A1 | 11/2008 | Steelberg et al. |
| 2008/0301734 A1 | 12/2008 | Goldeen et al. |
| 2008/0320100 A1 | 12/2008 | Pantos et al. |
| 2009/0010429 A1 | 1/2009 | Kim et al. |
| 2009/0010622 A1 | 1/2009 | Yahata et al. |
| 2009/0013195 A1 | 1/2009 | Ochi et al. |
| 2009/0067367 A1 | 3/2009 | Buracchini et al. |
| 2009/0077143 A1 | 3/2009 | Macy, Jr. |
| 2009/0106082 A1 | 4/2009 | Senti et al. |
| 2009/0132599 A1 | 5/2009 | Soroushian et al. |
| 2009/0169001 A1 | 7/2009 | Tighe et al. |
| 2009/0178090 A1 | 7/2009 | Oztaskent |
| 2009/0187957 A1 | 7/2009 | Avkarogullari |
| 2009/0249081 A1 | 10/2009 | Zayas |
| 2009/0282162 A1 | 11/2009 | Mehrotra et al. |
| 2009/0310819 A1 | 12/2009 | Hatano |
| 2010/0057576 A1 | 3/2010 | Brodersen et al. |
| 2010/0142915 A1 | 6/2010 | Mcdermott et al. |
| 2010/0185854 A1 | 7/2010 | Burns et al. |
| 2010/0191590 A1 | 7/2010 | Hakkarainen et al. |
| 2010/0198943 A1 | 8/2010 | Harrang et al. |
| 2010/0250772 A1 | 9/2010 | Mao |
| 2011/0010466 A1 | 1/2011 | Fan et al. |
| 2011/0035517 A1 | 2/2011 | Minnick et al. |
| 2011/0058675 A1 | 3/2011 | Brueck et al. |
| 2011/0082924 A1 | 4/2011 | Gopalakrishnan |
| 2011/0083009 A1 | 4/2011 | Shamoon et al. |
| 2011/0093447 A1 | 4/2011 | Goto |
| 2011/0096828 A1 | 4/2011 | Chen et al. |
| 2011/0103364 A1 | 5/2011 | Li |
| 2011/0103374 A1 | 5/2011 | Lajoie et al. |
| 2011/0135090 A1 | 6/2011 | Chan et al. |
| 2011/0145858 A1 | 6/2011 | Philpott et al. |
| 2011/0158470 A1 | 6/2011 | Martin et al. |
| 2011/0170687 A1 | 7/2011 | Hyodo et al. |
| 2011/0173345 A1 | 7/2011 | Knox et al. |
| 2011/0179185 A1 | 7/2011 | Wang et al. |
| 2011/0179356 A1 | 7/2011 | Bassali |
| 2011/0197261 A1 | 8/2011 | Dong et al. |
| 2011/0231569 A1 | 9/2011 | Luby et al. |
| 2011/0238789 A1 | 9/2011 | Luby et al. |
| 2011/0246661 A1 | 10/2011 | Manzari et al. |
| 2011/0276676 A1 | 11/2011 | Kang et al. |

(56) References Cited

U.S. PATENT DOCUMENTS

| | | |
|---|---|---|
| 2011/0296048 A1 | 12/2011 | Knox et al. |
| 2011/0314130 A1 | 12/2011 | Strasman |
| 2012/0005312 A1 | 1/2012 | Mcgowan et al. |
| 2012/0005313 A1 | 1/2012 | McGowan et al. |
| 2012/0042090 A1 | 2/2012 | Chen et al. |
| 2012/0047542 A1 | 2/2012 | Lewis et al. |
| 2012/0054856 A1 | 3/2012 | Johansson |
| 2012/0059912 A1 | 3/2012 | Fernando |
| 2012/0110120 A1 | 5/2012 | Willig et al. |
| 2012/0134496 A1 | 5/2012 | Farkash et al. |
| 2012/0137015 A1 | 5/2012 | Sun |
| 2012/0167132 A1 | 6/2012 | Mathews et al. |
| 2012/0170642 A1 | 7/2012 | Braness et al. |
| 2012/0173751 A1 | 7/2012 | Braness et al. |
| 2012/0185608 A1 | 7/2012 | McGowan et al. |
| 2012/0209961 A1 | 8/2012 | McCoy et al. |
| 2012/0254456 A1 | 10/2012 | Visharam et al. |
| 2012/0303766 A1 | 11/2012 | McGowan et al. |
| 2012/0311174 A1 | 12/2012 | Bichot et al. |
| 2012/0331167 A1 | 12/2012 | Hunt |
| 2013/0006869 A1 | 1/2013 | Grab et al. |
| 2013/0007200 A1 | 1/2013 | van der Schaar et al. |
| 2013/0013803 A1 | 1/2013 | Bichot et al. |
| 2013/0018632 A1 | 1/2013 | Field et al. |
| 2013/0051554 A1 | 2/2013 | Braness et al. |
| 2013/0054958 A1 | 2/2013 | Braness et al. |
| 2013/0054972 A1 | 2/2013 | Thorwirth |
| 2013/0080267 A1 | 3/2013 | McGowan |
| 2013/0080596 A1 | 3/2013 | McGowan et al. |
| 2013/0080772 A1 | 3/2013 | McGowan et al. |
| 2013/0081110 A1 | 3/2013 | McGowan et al. |
| 2013/0179199 A1 | 7/2013 | Ziskind et al. |
| 2013/0254346 A1 | 9/2013 | McGowan et al. |
| 2013/0318249 A1 | 11/2013 | McDonough et al. |
| 2014/0003516 A1 | 1/2014 | Soroushian |
| 2014/0140253 A1 | 5/2014 | Lohmar et al. |
| 2014/0149557 A1 | 5/2014 | Lohmar et al. |
| 2014/0223303 A1 | 8/2014 | Cox et al. |
| 2014/0359075 A1 | 12/2014 | Amidei et al. |
| 2015/0006662 A1 | 1/2015 | Braness |
| 2015/0019550 A1 | 1/2015 | Maharajh et al. |
| 2015/0019866 A1 | 1/2015 | Braness et al. |
| 2015/0139419 A1 | 5/2015 | Kiefer et al. |
| 2015/0288530 A1 | 10/2015 | Oyman |
| 2016/0164939 A1 | 6/2016 | Braness et al. |
| 2016/0197971 A1 | 7/2016 | Cen et al. |
| 2016/0323342 A1 | 11/2016 | Luby et al. |
| 2017/0011055 A1 | 1/2017 | Pitts |
| 2017/0324793 A1 | 11/2017 | Braness et al. |
| 2018/0046949 A1 | 2/2018 | Kahn et al. |
| 2018/0255366 A1 | 9/2018 | Lockett et al. |
| 2019/0173932 A1 | 6/2019 | Braness et al. |
| 2019/0268394 A1 | 8/2019 | Cen et al. |
| 2020/0244714 A1 | 7/2020 | Cen et al. |

FOREIGN PATENT DOCUMENTS

| | | | |
|---|---|---|---|
| CN | 103999033 A | | 8/2014 |
| CN | 103999033 B | | 8/2016 |
| CN | 106254900 A | | 12/2016 |
| CN | 107111477 A | | 8/2017 |
| CN | 106264900 B | | 9/2019 |
| EP | 1158799 A1 | | 11/2001 |
| EP | 1453319 A1 | | 9/2004 |
| EP | 1536646 A1 | | 6/2005 |
| EP | 1283640 B1 | | 10/2006 |
| EP | 2180664 A1 | | 4/2010 |
| EP | 2360923 A1 | | 8/2011 |
| EP | 3243130 A1 | | 11/2017 |
| EP | 3243130 B1 | | 8/2019 |
| EP | 3570520 A1 | | 11/2019 |
| EP | 3570520 B1 | | 2/2021 |
| GB | 2398210 A | | 8/2004 |
| HK | 1197306 A1 | | 1/2015 |
| HK | 1229978 A | | 11/2017 |
| HK | 1242001 A | | 6/2018 |
| HK | 1246429 A | | 9/2018 |
| HK | 1246429 B | | 4/2020 |
| HK | 40013764 A | | 8/2020 |
| HK | 1229978 B | | 6/2021 |
| JP | H07143475 A | | 6/1995 |
| JP | H1175178 A | | 3/1999 |
| JP | 2001204001 A | | 7/2001 |
| JP | 2004350043 A | | 12/2004 |
| JP | 2005107725 A | | 4/2005 |
| JP | 2005173241 A | | 6/2005 |
| JP | 2005284041 A | | 10/2005 |
| JP | 2008507160 A | | 3/2008 |
| JP | 2009188690 A | | 8/2009 |
| JP | 4516082 B2 | | 5/2010 |
| JP | 2011087103 A | | 4/2011 |
| JP | 2011087165 A | | 4/2011 |
| JP | 2011204001 A | | 10/2011 |
| JP | 2013509818 A | | 3/2013 |
| JP | 2014506430 A | | 3/2014 |
| JP | 2014528376 A | | 10/2014 |
| JP | 2014529967 A | | 11/2014 |
| JP | 2016036161 A | | 3/2016 |
| JP | 6076347 B2 | | 2/2017 |
| JP | 6254987 B2 | | 12/2017 |
| JP | 2018-505594 A | | 2/2018 |
| JP | 2018064287 A | | 4/2018 |
| JP | 6522723 B2 | | 5/2019 |
| JP | 2019134487 A | | 8/2019 |
| JP | 2020141415 A | | 9/2020 |
| KR | 20040039852 A | | 5/2004 |
| KR | 20060030164 A | | 4/2006 |
| KR | 20060106250 A | | 10/2006 |
| KR | 20060116967 A | | 11/2006 |
| KR | 20070020727 A | | 2/2007 |
| KR | 20090016282 A | | 2/2009 |
| KR | 1020100082182 A | | 7/2010 |
| KR | 1020140062479 A | | 5/2014 |
| KR | 1020170103863 A | | 9/2017 |
| KR | 10-1903352 B1 | | 9/2018 |
| KR | 1955363 B1 | | 2/2019 |
| KR | 101955363 B1 | | 3/2019 |
| KR | 102012682 | | 8/2019 |
| KR | 10-2166291 B1 | | 10/2020 |
| RU | 2328040 C2 | | 6/2008 |
| WO | 199800973 A1 | | 1/1998 |
| WO | 199834405 A1 | | 8/1998 |
| WO | 1998047290 | | 10/1998 |
| WO | 2000049762 A2 | | 8/2000 |
| WO | 2000049763 A1 | | 8/2000 |
| WO | 200223315 A2 | | 3/2002 |
| WO | 2003028293 | | 4/2002 |
| WO | 2002035832 A2 | | 5/2002 |
| WO | 2002054776 | | 7/2002 |
| WO | 2002073437 A1 | | 9/2002 |
| WO | 2002087241 A1 | | 10/2002 |
| WO | 2003046750 A1 | | 6/2003 |
| WO | 2003047262 A2 | | 6/2003 |
| WO | 2003061173 A2 | | 7/2003 |
| WO | 2004012378 A2 | | 2/2004 |
| WO | 2004100158 A1 | | 11/2004 |
| WO | 2005008385 A2 | | 1/2005 |
| WO | 2005015935 A1 | | 2/2005 |
| WO | 2005057906 A2 | | 6/2005 |
| WO | 2005111835 A2 | | 11/2005 |
| WO | 2005125214 A2 | | 12/2005 |
| WO | 2006019490 A2 | | 2/2006 |
| WO | 2007072257 A1 | | 6/2007 |
| WO | 2007093923 A1 | | 8/2007 |
| WO | 2007101182 A2 | | 9/2007 |
| WO | 2008032908 A1 | | 3/2008 |
| WO | 2009006302 A1 | | 1/2009 |
| WO | 2005111835 A3 | | 3/2009 |
| WO | 2009109976 A2 | | 9/2009 |
| WO | 2010079950 A2 | | 7/2010 |
| WO | 2011038013 A2 | | 3/2011 |
| WO | 2011053658 A1 | | 5/2011 |
| WO | 2011087449 A1 | | 7/2011 |
| WO | 2011101371 A1 | | 8/2011 |

(56) References Cited

FOREIGN PATENT DOCUMENTS

| WO | 2011103364 A1 | 8/2011 |
|---|---|---|
| WO | 2012094171 A1 | 7/2012 |
| WO | 2013032517 A1 | 3/2013 |
| WO | 2013101841 A1 | 7/2013 |
| WO | 2016112112 A1 | 7/2016 |

OTHER PUBLICATIONS

Stockhammer, "Dynamic Adaptive Streaming over HTTP—Standards and Design Principles", Proceedings of the second annual ACM conference on Multimedia, Feb. 2011, 11 pgs.
Toldo et al., "A Resilent and Low-Delay P2P Streaming System Based on Network Coding with Random Multicast Trees", 2010 IEEE International Workshop on Multimedia Signal Processing, Year. 2010, https://ieeexplore.ieee.org/stamp/stamp.jsp?tp=&arnumber= 5662054, 6 pgs.
Declaration of Dr. Clifford Reader, Inter Partes Review of U.S. Pat. No. 9,270,720, IPR filed Mar. 11, 2020. 158 pgs.
Declaration of Dr. Clifford Reader, Inter Partes Review of U.S. Pat. No. 9,998,515, IPR filed Mar. 11, 2020. 184 pgs.
Defendant Hulu, LLC's Invalidity Contentions for U.S. Pat. No. 7,295,673; U.S. Pat. No. 8,139,651; U.S. Pat. No. 8,472,792; U.S. Pat. No. 9,270,720; U.S. Pat. No. 9,998,515; U.S. Pat. No. 10,212,486; U.S. Pat. No. 10,225,588, *DIVX, LLC* v. *Hulu, LLC*, Case No. 2:19-cv-1606-PSG-DFMx, C.D. Cal., Apr. 2, 2020, 136 pgs.
Defendant Netflix, Inc.'s Invalidity Contentions for U.S. Pat. No. 7,295,673; U.S. Pat. No. 8,139,651; U.S. Pat. No. 8,472,792; U.S. Pat. No. 9,270,720; U.S. Pat. No. 9,998,515; U.S. Pat. No. 10,212,486; U.S. Pat. No. 10,225,588; U.S. Pat. No. 9,184,920, *DIVX, LLC* v. *Netflix, Inc.*, Case No. 2:19-cv-1602-PSG-DFM, C.D. Cal., Apr. 2, 2020, 148 pgs.
Excerpt from DivX Infringement Contentions in U.S. Pat. No. 9,270,720 Patent (re Hulu), IPR2020-00647 filed Mar. 11, 2020, 1 page.
Excerpt from DivX Infringement Contentions in U.S. Pat. No. 9,270,720 Patent (re Netflix), IPR2020-00647 filed Mar. 11, 2020, 1 page.
Excerpts from DivX's Contentions to Hulu, U.S. Pat. No. 9,998,515, IPR2020-00648, filed Mar. 11, 2020, 5 pgs.
Excerpts from DivX's Contentions to Netflix, U.S. Pat. No. 9,998,515, IPR2020-00648, filed Mar. 11, 2020, 26 pgs.
Information Technology—MPEG Systems Technologies—Part 7: Common Encryption in ISO Base Media File Format Files (ISO/IEC 23001-7), Apr. 2015, 24 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media Filea Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision Jan. 20, 2003, Dec. 2004, 121 pgs.
MPEG-DASH presentation at Streaming Media West 2011, Nov. 2011, 14 pgs.
Petition for Inter Partes Review of U.S. Pat. No. 9,270,720, IPR2020-00647, 82 pgs, IPR filed Mar. 11, 2020.
Petition for Inter Partes Review of U.S. Pat. No. 9,998,515, IPR2020-00648, 85 pgs, IPR filed Mar. 11, 2020.
Pomelo, LLC Tech Memo, Analysis of Netflix's Security Framework for 'Watch Instantly' Service, Mar.-Apr. 2009, 18 pgs.
Power of Attorney—Hulu, LLC, (IPR2020-00647), 4 pgs, IPR filed Mar. 11, 2020.
Power of Attorney—Hulu, LLC, (IPR2020-00648), 4 pgs, IPR filed Mar. 11, 2020.
Power of Attorney—Netflix, Inc. (IPR2020-00647), 4 pgs, IPR filed Mar. 11, 2020.
Power of Attorney—Netflix, Inc. (IPR2020-00648), 4 pgs, IPR filed Mar. 11, 2020.
Prosecution File History for U.S. Pat. No. 9,270,720, IPR filed Mar. 11, 2020, 350 pgs, presented in 3 parts.
Prosecution File History for U.S. Pat. No. 9,998,515, IPR filed Mar. 11, 2020, presented in 8 parts.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
U.S. Appl. No. 61/409,285 (Puneet), filed Aug. 11, 2011, 43 pgs.
U.S. Appl. No. 61/522,623 (Willig), filed Nov. 2, 2010, 44 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Information Technology-Coding of Audio Visual Objects—Part 2: Visual", International Standard, ISO/IEC 14496-2, Third Edition, Jun. 1, 2004, pp. 1-724. (presented in three parts).
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs. check duplicate.
"Microsoft Smooth Streaming specification", Jul. 22, 2013, 56 pgs.
"OpenDML AVI File Format Extensions Version 1.02", OpenDML AVI MJPEG File Format Subcommittee. Last revision: Feb. 28, 1996. Reformatting: Sep. 1997, 42 pgs.
"Single-Encode Streaming for Multiple Screen Delivery", Telestream Wowza Media Systems, 2009, 6 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.
Abomhara et al. "Enhancing Selective Encryption for H.264/AVC Using Advanced Encryption Standard", International Journal of computer Theory and Engineering, Apr. 2010, vol. 2, No. 2, pp. 223-229.
Alattar et al., A.M. "Improved selective encryption techniques for secure transmission of MPEG video bit-streams", In Proceedings 1999 International Conference on Image Processing (Cat. 99CH36348), vol. 4, IEEE, 1999, pp. 256-260.
Antoniou et al. "Adaptive Methods for the Transmission of Video Streams in Wireless Networks", 2015, 50 pgs.
Apostolopoulos et al. "Secure Media Streaming and Secure Transcoding", Multimedia Security Technologies for Digital Rights Management, 2006, 33 pgs.
Asai et al. "Essential Factors for Full-Interactive VOD Server: Video File System, Disk Scheduling, Network", Proceedings of Globecom '95, Nov. 14-16, 1995, 6 pgs.
Beker et al. "Cipher Systems, The Protection of Communications", 1982, 40 pgs.
Bocharov et al, "Portable Encoding of Audio-Video Objects, The Protected Interoperable File Format (PIFF)", Microsoft Corporation, First Edition Sep. 8, 2009, 30 pgs.

(56) References Cited

OTHER PUBLICATIONS

Bulterman et al. "Synchronized Multimedia Integration Language (SMIL 3.0)", W3C Recommendation, Dec. 1, 2008, https://www.w3.org/TR/2008/REC-SMIL3-20081201/, 321 pgs, (presented in five parts).
Cahill et al. "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 16, 2002.
Chaddha et al. "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al. "Partial encryption of compressed images and videos", IEEE Transactions on Signal Processing, vol. 48, No. 8, Aug. 2000, 33 pgs.
Cheung et al. "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Diamantis et al. "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, 2001, 66 pgs.
Fang et al. "Real-time deblocking filter for MPEG-4 systems", Asia-Pacific Conference on Circuits and Systems, Oct. 28-31, 2002, Bail, Indonesia, 4 pgs.
Fecheyr-Lippens, "A Review of HTTP Live Streaming", Jan. 2010, 38 pgs.
Fukuda et al. "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, 4 pgs.
Huang, U.S. Pat. No. 7,729,426, U.S. Appl. No. 11/230,794, filed Sep. 20, 2005.
Huang et al. "Adaptive MLP post-processing for block-based coded images", IEEE Proceedings—Vision, Image and Signal Processing, vol. 147, No. 5, Oct. 2000, pp. 463-473.
Huang et al. "Architecture Design for Deblocking Filter in H.264/JVT/AVC", 2003 International Conference on Multimedia and Expo., Jul. 6-9, 2003, Baltimore, MD, 4 pgs.
Jain et al., U.S. Appl. No. 61/522,623, filed Aug. 11, 2011.
Jung et al. "Design and Implementation of an Enhanced Personal Video Recorder for DTV", IEEE Transactions on Consumer Electronics, vol. 47, No. 4, Nov. 2001, 6 pgs.
Kalva, Hari "Delivering MPEG-4 Based Audio-Visual Services", 2001, 113 pgs.
Kang et al. "Access Emulation and Buffering Techniques for Steaming of Non- Stream Format Video Files", IEEE Transactions on Consumer Electronics, vol. 43, No. 3, Aug. 2001, 7 pgs.
Kim et al, "A Deblocking Filter with Two Separate Modes in Block-based Video Coding", IEEE transactions on circuits and systems for video technology, vol. 9, No. 1, 1999, pp. 156-160.
Kim et al. "Tree-Based Group Key Agreement", Feb. 2004, 37 pgs.
Laukens, "Adaptive Streaming—A Brief Tutorial", EBU Technical Review, 2011, 6 pgs.
Legault et al. "Professional Video Under 32-bit Windows Operating Systems", SMPTE Journal, vol. 105, No. 12, Dec. 1996, 10 pgs.
Li et al. "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al. "Adaptive deblocking filter", IEEE transactions on circuits and systems for video technology, vol. 13, No. 7, Jul. 2003, pp. 614-619.
Massoudi et al. "Overview on Selective Encryption of Image and Video: Challenges and Perspectives", EURASIP Journal on Information Security, Nov. 2008, 18 pgs.
McCanne et al. "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Newton et al. "Preserving Privacy by De-identifying Facial Images", Carnegie Mellon University School of Computer Science, Technical Report, CMU-CS-03-119, Mar. 2003, 26 pgs.
O'Brien, U.S. Appl. No. 60/399,846, filed Jul. 30, 2002.
O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al. "A postprocessing method for reducing quantization effects in low bit-rate moving picture coding", IEEE Transactions on Circuits and Systems for Video Technology, vol. 9, No. 1, Feb. 1999, pp. 161-171.
Richardson, "H.264 and MPEG-4 Video Compression", Wiley, 2003, 306 pgs. (presented in 2 parts).
Sima et al. "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al. "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al. "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Timmerer et al. "HTTP Streaming of MPEG Media", Proceedings of Streaming Day, 2010, 4 pgs.
Tiphaigne et al. "A Video Package for Torch", Jun. 2004, 46 pgs.
Trappe et al. "Key Management and Distribution for Secure Multimedia Multicast", IEEE Transaction on Multimedia, vol. 5, No. 4, Dec. 2003, pp. 544-557.
Van Deursen et al. "On Media Delivery Protocols in the Web", 2010 IEEE International Conference on Multimedia and Expo, Jul. 19-23, 2010, 6 pgs.
Ventura, Guillermo Albaida "Streaming of Multimedia Learning Objects", AG Integrated Communication System, Mar. 2003, 101 pgs.
Waggoner, "Compression for Great Digital Video", 2002, 184 pgs.
Watanabem et al. "MPEG-2 decoder enables DTV trick plays", researcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010.
Yang et al. "Projection-Based Spatially Adaptive Reconstruction of Block-Transform Compressed Images", IEEE Transactions on Image Processing, vol. 4, No. 7, Jul. 1995, pp. 896-908.
Yang et al. "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al. "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.

(56) References Cited

OTHER PUBLICATIONS

"Link Up Inc", Imasugu tsukaeru kantan (ready-to-use and easy) Plus+Google sabisu kanzendaijiten (complete dictionary of Google service), Gijutsu-Hyohron Co., Ltd., Oct. 25, 2014, the first edition, the first impression, p. 226, 228, 233, 238, 239, 242, 243, 244.
Decision Granting Petitioner's Request on Rehearing 37 C.F.R. § 42.71(d) Granting Institution of Inter Partes Review 35 U.S.C. § 314, IPR2020-00614, U.S. Pat. No. 7,295,673, 29 pgs.
Extended European Search Report for European Application No. 19185179.9, Search completed Jul. 26, 2019, dated Aug. 5, 2019, 10 pgs.
Extended European Search Report for European Application No. 16735361.4, Search completed Jul. 10, 2018, dated Jul. 18, 2018, 8 pgs.
International Preliminary Report on Patentability for International Application No. PCT/US2011/068274, International Filing Date Dec. 31, 2011, dated Mar. 4, 2014, 13 pgs.
International Preliminary Report on Patentability for International Application PCT/US2016/012348 Report dated Jul. 11, 2017, dated Jul. 20, 2017, 7 pgs.
International Search Report and Written Opinion for International Application No. PCT/US2016/012348, completed Feb. 11, 2016, dated Mar. 4, 2016, 8 pgs.
International Search Report and Written Opinion for International Application PCT/US2011/68274, Report Completed Apr. 10, 2012, 16 pgs.
"H.264—A Complete Guide to the Video Codec", May 2003, Retrieved from https://www.encoding.com/h-264/, 2 pgs.
"Information technology—Dynamic adaptive streaming for HTTP (DASH): Part 1: Media presentation and description and segment formats", International Standard, ISO/IEC 23009-1, Second edition May 15, 2014, 152 pgs.
"MPEG-2, Part 1, ISO/IEC 13818-1", Information technology—Generic Coding of Moving Pictures and Associated Audio: Systems, Nov. 13, 1994, 162 pgs.
"MPEG-4, Part 14; ISO/IEC 14496-14", Information technology—Coding of audio-visual objects, Nov. 15, 2003, 18 pgs.
"Sustainability of Digital Formats: Planning for Library of Congress Collections", H.262 MPEG-2 Video Encoding (H.262), 7pgs.
"Sustainability of Digital Formats: Planning for Library of Congress Collections", MPEG-4, Visual Coding (Part 2), (Last Updated: Feb. 21, 2017), 6 pgs.
"Window Microsoft codecs", 2017, Retrieved from https://msdn.microsoft.com/enus/library/windows/desktop/ff819508(v=vs.85).aspx, 7 pgs.
Caglar et al., "MUVIS: A Content-Based Multimedia Indexing and Retrieval Framework", 2003 Proceedings of Seventh International Processing and its Applications, 8 pgs.
Chen et al., "A Spatio-Temporal Semantic Model for Multimedia Database Systems and Multimedia Information Systems", IEEE Knowledge and Data Engineering, vol. 13, Issue: 4, 16 pgs.
Chen et al., "Audio-on-Demand over Wireless Sensor Networks", 2012 IEEE 20th international Workshop on Quality of Service (iWQoS). Pub. Date; 2012, 9 pgs.
Ding et al., "Multisource Video On-Demand Streaming in Wireless Mesh Networks", IEEE/ACM Transactions on Networking. vol. 20, Issue: 6. Pub. Date: 2012, 14 pgs.
Fielding et al., "Hypertext Transfer Protocol—HTTP1.1", Network Working Group, RFC 2616, Jun. 1999, 114 pgs.
Guo et al., "A Multi-server Video Monitor System Based on Stream-Media Communication Technology", ISSCAA 2008. Pub. Date: 2008, 4 pgs.
Islam, "A HTTP Streaming Video Server with Dynamic Advertisement Splicing", Royal Institute of Technology (KTH), School of Information and Communication Technology, Master of Science Thesis, Mar. 21, 2010, Retrieved from: https://people.kth.se/~maguire/DEGREE-PROJECT-REPORTS/100409-Md._Safiqul_Islam-with-cover.pdf, 108 pgs.
Miras, "On Quality Aware Adaptation of Internet Video", University of London, PhD dissertation, 2004, 181 pgs.
Nelson, "Smooth Streaming Deployment Guide", Microsoft Expression Encoder, Aug. 2010, 66 pgs.
Oliveira et al., "Dynamic Generation of FMIL-Based Multimedia Interfaces", Journal of Multimedia, Oct. 2006, vol. 3, No. 4, pp. 14-25.
Padiadpu, Rashmi "Towards Mobile Learning: A SCORM Player for the Google Android Platform", Master Thesis, Hamburg University of Applied Sciences, 2008, 66 pgs.
Paul et al., "VTonDemand: A Framework For Indexing, Searching, and On-Demand Playback of RTP-Based Multimedia u Conferences", 1999 IEEE Third Workshop on Multimedia Signal Processing (Cat. No. 99th8451), 6 pgs.
Stockhammer, "Dynamic Adaptive Streaming over HTTP—Standards and Design Principles", 11 Proceedings of the second annual ACM conference on Multimedia systems, US, ACM, Feb. 23, 2011, URL, http://dl.acm.org/citation.cfm?id=1943572, 11 pgs.
Wei, "Pardon Our Dust", Hulu Blog, printed Apr. 30, 2014 from http://blog.hulu.com.2010/05/13/pardon-our-dust. 13 pgs.
Wowza Media Systems, "Using dynamically generated SMIL file possible:" printed Apr. 30, 2014 from http://www.wowza.com.forums/showthread.php?12458-using-dynamically-generated-SMIL-file-possible, 3 pgs.
International Standard, Information technology—Generic coding of moving pictures and associated audio information: Systems, ISO/IEC 13818-1:2000(E), Dec. 1, 2000 174 pgs.
"Broadcom BCM7413 Product Brief", Dec. 11, 2008, 2 pgs.
"Common Interface Specification for Conditional Access and other Digital Video Broadcasting Decoder Applications", European Standard, EN 50221, Feb. 1997, 86 pgs.
"Server 'Trick Play' support for MPEG-2 Transport Stream Files", www.live555.com/liveMedia/transport-stream-trick-play.html, 2006, Dec. 31, 2020, 1 pg.
"The LIVE555 Media Server", www.live555.com/mediaServer/#about, 2006, printed Dec. 31, 2020, 3 pgs.
Adb, "ADB-3800W Datasheet", 2007, 2 pgs.
Agi et al., "An Empirical Study of Secure MPEG Video Transmissions", IEEE, Mar. 1996, 8 pgs., DOI: 10.1109/NDSS.1996.492420.
Ahmed et al., "An Efficient Chaos-Based Feedback Stream Cipher (ECBFSC) for Image Encryption and Decryption", Informatica, Mar. 2007, vol. 31, No. 1, pp. 121-129.
Arachchi et al., "Adaptation-aware encryption of scalable H.264/AVC for content security", Signal Processing: Image Communication, Jul. 2009, vol. 24, pp. 468-483, doi:10.1016/j.image.2009.02.004.
Conklin et al., "Video coding for streaming media delivery on the Internet", IEEE Transactions on Circuits and Systems for Video Technology, Mar. 2001, vol. 11, No. 3, pp. 269-281.
Deshpande et al., "Scalable Streaming of JPEG2000 Images Using Hypertext Transfer Protocol", Multimedia '01: Proceedings of the Ninth ACM International Conference on Multimedia, Oct. 2001, pp. 372-381. https://doi.org/10.1145/500141.500197.
Entone, "Amulet High Definition IP Television Receiver User's Guide", 2008, 28 pgs.
Entone, "Hydra Hd IP Video Gateway", 2008, 2 pgs.
ETSI, "Digital Video Broadcasting (DVB) Support for use of scrambling and Conditional Access (CA) within digital broadcasting systems", Oct. 1996, 13 pgs.
ETSI, "Digital Video Broadcasting (DVB); Implementation guidelines for the use of Video and Audio Coding in Contribution and Primary Distribution Applications based on the MPEG-2 Transport Stream", ETSI TS 102 154 V1.2.1, May 2004, 73 pgs.
Fahmi et al., "Proxy Servers for Scalable Interactive Video Support", Computer, Sep. 2001, vol. 45, No. 9, pp. 54-60, https://doi.org/10.1109/2.947092.
Fielding et al., "Hypertext Transfer Protocol—HTTP1.1", "check duplicate" Network Working Group, RFC 2616, Jun. 1999, 114 pgs.
Fitzek et al., "A Prefetching Protocol for Continuous Media Streaming in Wireless Environments", IEEE Journal on Selected Areas in Communications, Oct. 2001, vol. 19, No. 10, pp. 2015-2028, DOI: 10.1109/49.957315.
Ho, "Digital Video Broadcasting Conditional Access Architecture", Report prepared for CS265-Section 2, Fall 2002, Prof Stamp, 7 pgs.

(56) References Cited

OTHER PUBLICATIONS

Isma, "ISMA Encryption and Authentication, Version 1.1, AREA/Task Force DRM", Internet Streaming Media Alliance, Sep. 15, 2006, pp. 1-64.
ITU-T, "Series J: Cable Networks and Transmission of Television, Sound Programme and Other Multimedia Signals", Technical method for ensuring.
Privacy in long-distance international MPEG-2 television transmission conforming to ITU-T J.89, ITU-T Recommendation J.96, Mar. 2001, 34 pgs.
Kabir, "Scalable and Interactive Multimedia Streaming Over the Internet", Thesis, 2005, 207 pgs.
Krikor et al., "Image Encryption Using DCT and Stream Cipher", European Journal of Scientific Research, Jan. 2009, vol. 32, No. 1, pp. 48-58.
Lian et al., "Recent Advances in Multimedia Information System Security", Informatica, Jan. 2009, vol. 33, pp. 3-24.
Lian et al., "Selective Video Encryption Based on Advanced Video Coding", PCM, Nov. 2005, Part II, LNCS 3768, pp. 281-290.
Lievaart, "Characteristics that differentiate CA Systems", Irdeto access, Nov. 2001, 5 pgs.
Lloyd, "Supporting Trick Mode Playback Universally Across the Digital Television Industry", Thesis, 2005, 111 pgs.
Macaulay et al., "Whitepaper—IP Streaming of MPEG-4: Native RTP vs MPEG-2 Transport Stream", Envivio, Oct. 2005, 12 pgs.
Martin et al., "Privacy Protected Surveillance Using Secure Visual Object Coding", IEEE Transactions on Circuits and Systems for Video Technology, Aug. 2008, vol. 18, No. 8, pp. 1152-1162, Doi: 10.1109/TCSVT.2008.927110.
Meyer et al., "Security mechanisms for Multimedia-Data with the Example MPEG-I-Video", SECMPEG, 1992, 10 pgs.
Molavi et al., "A Security Study of Digital TV Distribution Systems", Thesis, Jun. 2005, 112 pgs.
NCITS/ISO/IEC, "Information Technology—Generic Coding Of Moving Pictures And Associated Audio Information: Video (Formerly ANSI/ISO/IEC 13818-Feb. 2000)", Second edition, Dec. 15, 2000, 220 pgs. (presented in two parts).
Nelson, "The Data Compression Book", M&T Publishing, 1992, 533 pgs., (presented in two parts).
OIPF Open Forum, "OIPF Release 1 Specification, vol. 3, Content Metadata", OIPF, Octobers, 2009, vol. 1.1, 47 pgs.
OIPF Open Forum, "OIPF Release 1 Specification, vol. 7—Authentication, Content Protection and Service Protection", OIPF, Octobers, 2009, vol. 1.1, 88 pgs.
Open IPTV Forum, "Functional Architecture", Jan. 16, 2008, vol. 1.1, 141 pgs.
Open IPTV Forum, "OIPF Release 1 Specification, vol. 1—Overview", OIPF, Oct. 8, 2009, vol. 1.1, 48 pgs.
Open IPTV Forum, "OIPF Release 1 Specification, vol. 2, Media Formats", OIPF, Octobers, 2009, vol. 1.1, 22 pgs.
Park et al., "An Efficient Encryption and Key Management Scheme for Layered Access Control of H.265/Scalable Video Coding", IEICI Trans. Inf. & Syst., May 2009, vol. E92-D, No. 5, pp. 851-858, DOI 1031587/transinf.E92.D.851.
Park et al., "Combined Scheme of Encryption and Watermarking in H.264/Scalable Video Coding", New Directions in Intelligent Interactive Multimedia, SCI 142, 2008, pp. 351-361.
Qiao et al., "Comparison of MPEG Encryption Algorithms", Comput. & Graphics, 1998, vol. 22, No. 4, pp. 437-448.
Raju et al., "Fast and Secure Real-Time Video Encryption", Sixth Indian Conference on Computer Vision, Graphics & Image Processing, Jan. 2009, pp. 257-264, doi:10.1109/ACVGI p. 2008.100.
Senoh et al., "DRM Renewability & Interoperability", IEEEXplore, Conference: Consumer Communications and Networking Conference, 2004, Feb. 2004, pp. 424-429, DOI: 10.1109/CCNC.2004.1286899.
Conference: Consumer Communications and Networking Conference, 2004. CCNC2004. First IEEE.
Shojania et al., "Experiences with MPEG-4 Multimedia Streaming", CiteSeer, Jan. 2001, 3 pgs., DOI: 10.1145/500141.500221.
Symes, "Video Compression Demystified", McGraw-Hill, 2001, 353 pgs., (presented in two parts).
Taymans et al., "GStreamer Application Development Manual (1.6.0)", 2007, 159 pgs.
Thomas et al., "A Novel Secure H.264 Transcoder Using Selective Encryption", Proceedings in International Conference on Image Processing, Jan. 2007, vol. 4, pp. IV-85-IV-88, DOI: 10.1109/ICIP.2007.4379960.
Tosun et al., "Efficient multi-layer coding and encryption of MPEG video streams", 2000 IEEE International Conference on Multimedia and Expo. ICME2000. Proceedings. Latest Advances in the Fast Changing World of Multimedia (Cat. No.OOTH8532), July 30-Aug. 2, 2000, pp. 119-122, Doi 10.1109/ICME.2000.869559.
Um, "Selective Video Encryption of Distributed Video Coded Bitstreams and Multicast Security over Wireless Networks", Thesis, Aug. 2006, 142 pgs.
Wang, "Lightweight Encryption in Multimedia", Thesis, Jun. 2005, 184 pgs.
Wong, "Web Client Programming with Perl", 1997, printed Jan. 8, 2021 from: https://www.oreilly.com/openbook-webclientch03.html, 31 pgs.
Wu, "A Fast MPEG Encryption Algorithm and Implementation of AES on CAM", Thesis, Oct. 6, 2003, 91 pgs.
Yuksel, "Partial Encryption of Video for Communication and Storage", Thesis, Sep. 2003, 78 pgs.

* cited by examiner

SYSTEMS, METHODS, AND MEDIA FOR PLAYING BACK PROTECTED VIDEO CONTENT BY USING TOP LEVEL INDEX FILE

CROSS REFERENCE TO RELATED APPLICATIONS

This application is a continuation application of U.S. patent application Ser. No. 16/207,405, entitled "Systems and Methods for Automatically Generating Top Level Index Files" to Braness et al., filed Dec. 3, 2018, which application is a continuation application of U.S. patent application Ser. No. 15/658,057, entitled "Systems and Methods for Automatically Generating Top Level Index Files" to Braness et al., filed Jul. 24, 2017 and issued on Dec. 11, 2018 as U.S. Pat. No. 10,154,075, which application was a continuation of U.S. patent application Ser. No. 15/009,593, entitled "Systems and Methods for Automatically Generating Top Level Index Files" to Braness et al., filed Jan. 28, 2016 and issued on Jun. 12, 2018 as U.S. Pat. No. 9,998,515, which application was a continuation of U.S. patent application Ser. No. 14/336,392, entitled "Systems and Methods for Automatically Generating Top Level Index Files" to Braness et al., filed Jul. 21, 2014 and issued on Feb. 23, 2016 as U.S. Pat. No. 9,270,720, which application was a continuation of U.S. patent application Ser. No. 13/341,789, entitled "Systems and Methods for Automatically Generating Top Level Index Files" to Braness et al., filed Dec. 30, 2011 and issued on Jul. 22, 2014 as U.S. Pat. No. 8,787,570, which application claimed priority to U.S. Provisional Application Ser. No. 61/529,403, entitled "Automatic Generation of SMIL Files" to Braness et al., filed Aug. 31, 2011, the entirety of which are incorporated herein by reference.

FIELD OF THE INVENTION

The present invention generally relates to streaming media and more specifically to the automatic generation of top level index files for use in adaptive bitrate streaming.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the playback device's network bandwidth and video decoding capacity) in real time and adjusting the quality of the streamed media accordingly. Typically, the source media is encoded as separate streams having different maximum bitrates and the playback device or client switches between streaming the different encodings depending on available resources. When a playback device commences adaptive bitrate streaming, the playback device typically starts by requesting portions of media from an initial set of streams. As the playback device downloads the requested media, the playback device can measure the available bandwidth. In the event that the available bandwidth increases or decreases, the playback device can switch to higher or lower bitrate streams.

Adaptive streaming solutions typically utilize Hypertext Transfer Protocol (HTTP), published by the Internet Engineering Task Force and the World Wide Web Consortium as RFC 2616, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

SUMMARY OF THE INVENTION

Systems and methods in accordance with embodiments of the invention automatically generate top level index files for use in adaptive bitrate streaming. One embodiment of the method of the invention includes receiving a request from a playback device at a playback server, where the request identifies a piece of content, retrieving a list of assets associated with the identified piece of content using the playback server, filtering the list of assets using at least one predetermined criterion using the playback server, generating a top level index file describing each asset in the filtered list of assets using the playback server, and sending the top level index file to the playback device using the playback server.

In a further embodiment of the method of the invention, the request from the playback device also includes information describing the capabilities of the playback device, and the playback server filters the list of assets based upon the capabilities of the playback device.

In another embodiment of the method of the invention, the information describing the capabilities of the playback device is a product identifier, and the method further including retrieving at least one device capability based upon the product identifier using the playback server.

In a still further embodiment of the method of the invention, the device capability is at least one device capability selected from the group consisting of: display aspect ratio, anticipated maximum network connection data rate, device outputs, supported formats, device buffer size, device resolution, device region, and device language.

In still another embodiment of the method of the invention, the at least one predetermined criterion includes whether the playback device has access to assets associated with premium content.

In a yet further embodiment of the method of the invention, the request from the playback device also includes information indicative of the geographic location of the playback device, and the at least one predetermined criterion includes whether an asset is permitted to be played back in the geographic location indicated by the request.

In yet another embodiment of the method of the invention, the at least one predetermined criterion includes filtering the assets based upon at least one language.

In a further embodiment again of the method of the invention, the playback server maintains a database of assets associated with specific pieces of content.

In another embodiment again of the method of the invention, the top level index file is a SMIL file.

In a further additional embodiment of the method of the invention, generating a top level index file describing each asset in the filtered list of assets using the playback server includes generating an XML string including a URI for each asset.

Another additional embodiment of the method of the invention also includes generating an XML string including a SWITCH element to describe alternative streams for use in adaptive bitrate streaming.

A still yet further embodiment of the method of the invention also includes generating an XML string including an EXCL element to describe alternative streams for use in conventional streaming.

In still yet another embodiment of the method of the invention, the URI references a container file and the XML string for each assets includes an element that defines the size of a header section of the container file.

In a still further embodiment again of the method of the invention, the XML string includes an element that identifies the encoding of the asset.

In another embodiment again of the method of the invention, the XML string of a video asset includes at least one element selected from the group including an element that describes the maximum bitrate of the video, an element that describes the width and height of the video, and an element that describes the video buffer verifier size of the video.

A still further additional embodiment of the method of the invention includes receiving a request from a playback device at a playback server, where the request identifies a piece of content, retrieving a list of assets associated with the identified piece of content using the playback server, filtering the list of assets using at least one predetermined criterion using the playback server, generating a top level index file describing each asset in the filtered list of assets using the playback server, sending the top level index file to the playback device using the playback server, retrieving cryptographic information using the playback server, where the cryptographic information is used to access protected streams described in the top level index file, and providing the cryptographic information to the playback device using the playback server.

In still another additional embodiment of the method of the invention, the cryptographic information is retrieved by the playback server in response to a request from a playback device to playback the content.

In a yet further embodiment again of the method of the invention, the cryptographic information is retrieved by the playback server from a database of cryptographic information and is encrypted so that the playback device can access the cryptographic information using cryptographic information stored on the playback device.

In yet another embodiment again of the method of the invention, the cryptographic information is retrieved by the playback server from a digital rights management server.

A yet further additional embodiment of the method of the invention also includes confirming that the number of devices on which the user is currently playing back content is less than a predetermined concurrency limit.

Yet another additional embodiment of the method of the invention also includes receiving a play event report from the playback device at the playback server.

A further additional embodiment again of the method of the invention also includes providing a command to the playback device using the playback server in response to the play event report.

In another additional embodiment again of the method of the invention, the play event report includes a playback location.

A still yet further embodiment again of the method of the invention also includes sending a command to resume playback at the playback location indicated in the play event report to a second playback device.

Still yet another embodiment again of the method of the invention also includes sending a command to stop playback to the playback device that generated the play event report using the playback server.

A further embodiment of the invention includes a database that stores descriptions of assets associated with specific pieces of content, and a processor configured using a playback management application. In addition, the playback management application configures the processor to: receive a request from a playback device identifying a piece of content; retrieve a list of assets associated with the identified piece of content; filter the list of assets using at least one predetermined criterion; generate a top level index file describing each asset in the filtered list of assets; and send the top level index file to the playback device.

Another embodiment includes the request from the playback device also includes information describing the capabilities of the playback device, and the playback management application configures the processor to filter the list of assets based upon the capabilities of the playback device.

In a still further embodiment, the information describing the capabilities of the playback device is a product identifier, and the playback management application further configures the processor to retrieve at least one device capability based upon the product identifier.

In still another embodiment, wherein the device capability is at least one device capability selected from the group consisting of: display aspect ratio, anticipated maximum network connection data rate, device outputs, supported formats, device buffer size, display resolution, device region, and device language.

In a yet further embodiment, the at least one predetermined criterion includes whether the playback device has access to assets associated with premium content.

In yet another embodiment, the request from the playback device also includes information indicative of the geographic location of the playback device, and the at least one predetermined criterion includes whether an asset is permitted to be played back in the geographic location indicated by the request.

In a further embodiment again, the at least one predetermined criterion includes filtering the assets based upon one or more languages.

In another embodiment again, the playback server maintains a database of assets associated with specific pieces of content.

In a further additional embodiment, the top level index file is a SMIL file.

In another additional embodiment, the playback management application configures the processor to generate a top level index file describing each asset in the filtered list of assets by configuring the processor to generate an XML string including a URI for each asset.

In a still yet further embodiment, the playback management application further configures the processor to generate an XML string including a SWITCH element to describe alternative streams for use in adaptive bitrate streaming.

In still yet another embodiment, the playback management application further configures the processor to generate an XML string including an EXCL element to describe alternative streams for use in conventional streaming.

In a still further embodiment again, the URI references a container file and the XML string for each asset includes an element that defines the size of a header section of the container file.

In still another embodiment again, the XML string includes an element that identifies the encoding of the asset.

In a still further additional embodiment, the XML string of a video asset includes at least one element selected from the group including an element that describes the maximum bitrate of the video, an element that describes the width and height of the video, and an element that describes the video buffer verifier size of the video.

In still another additional embodiment, playback management application further configures the processor to retrieve cryptographic information, where the cryptographic information is used to access protected streams described in the top level index file, and provide the cryptographic information to the playback device.

In a yet further embodiment again, the playback management application configures the processor to retrieve the cryptographic information in response to a request from a playback device to playback the content.

In yet another embodiment again, the playback management application configures the processor to retrieve the cryptographic information from a database of cryptographic information, and encrypt the retrieved cryptographic information so that the playback device can access the retrieved cryptographic information in the clear using cryptographic information stored on the playback device.

In a yet further additional embodiment, the playback management application configures the processor to retrieve the cryptographic information from a digital rights management server.

In yet another additional embodiment, the playback management application configures the processor to confirm that the number of devices on which the user is playing back content is less than a predetermined concurrency limit.

In a further additional embodiment again, the playback management application configures the processor to receive a play event report from the playback device.

In another additional embodiment again, the playback management application configures the processor to provide a command to the playback device in response to the play event report.

In a still yet further embodiment again, the play event report includes a playback location.

In still yet another embodiment again, the playback management application further configures the processor to send a command to resume playback at the playback location indicated in the play event report to a second playback device.

In a yet further additional embodiment again, the playback management application further configures the processor to send a command to stop playback to the playback device that generated the play event report using the playback server.

Another further embodiment includes a machine readable medium containing processor instructions, where execution of the instructions by a processor causes the processor to perform a process including receiving a request from a playback device identifying a piece of content, retrieving a list of assets associated with the identified piece of content, filtering the list of assets using at least one predetermined criterion, generating a top level index file describing each asset in the filtered list of assets; and sending the top level index file to the playback device.

In still another further embodiment, the execution of the instructions by a processor causes the processor to perform a process further including retrieving cryptographic information, where the cryptographic information is used to access protected streams described in the top level index file, and providing the cryptographic information to the playback device.

DETAILED DISCLOSURE OF THE INVENTION

Turning now to the drawings, systems and methods for automatically generating top level index files for use in adaptive bitrate streaming in accordance with embodiments of the invention are illustrated. A top level index is a file that describes the location and content of container files containing streams of media (e.g. audio, video, metadata, and subtitles) that can be utilized by the playback device to stream and playback content. In adaptive bitrate streaming systems, the top level index file typically references the alternative streams that the playback device can switch between. In many embodiments, a top level index file is generated in response to a request from a playback device. In several embodiments, the process of generating the top level index file involves determining all of the assets or container files containing streams associated with a specific piece of content and then filtering the assets based upon one or more predetermined criterion. In a number of embodiments, the assets are filtered based upon predetermined criteria including (but not limited to) business rules defined by the content owner, device capabilities, and/or information associated with a user account. In many embodiments, the top level video file that is generated is a SMIL file. In other embodiments, any of a variety of file formats can be utilized to generate top level index files in accordance with embodiments of the invention.

In several embodiments, a playback server automatically generates top level index files in response to a request from a playback device and the playback server can also provide the playback device with cryptographic information enabling playback of protected streams of content. In a number of embodiments, the playback device provides play event reports to the playback server and the playback server can track the playback location of the streams being played back by the playback device. The playback location can be utilized to enable a user to shift between watching content on different playback devices. The user can commence playback on a first device and then request playback on a second device. When the playback server receives a playback request from a second playback device, the playback server can suspend playback on the first playback device and provide an instruction to the second playback device to commence playback at the last playback location reported by the first playback device. Playback devices, playback servers and processes for automatically generating top level index files in response to requests from playback devices in accordance with embodiments of the invention are discussed further below.

Streaming System Architecture

Figure 1:
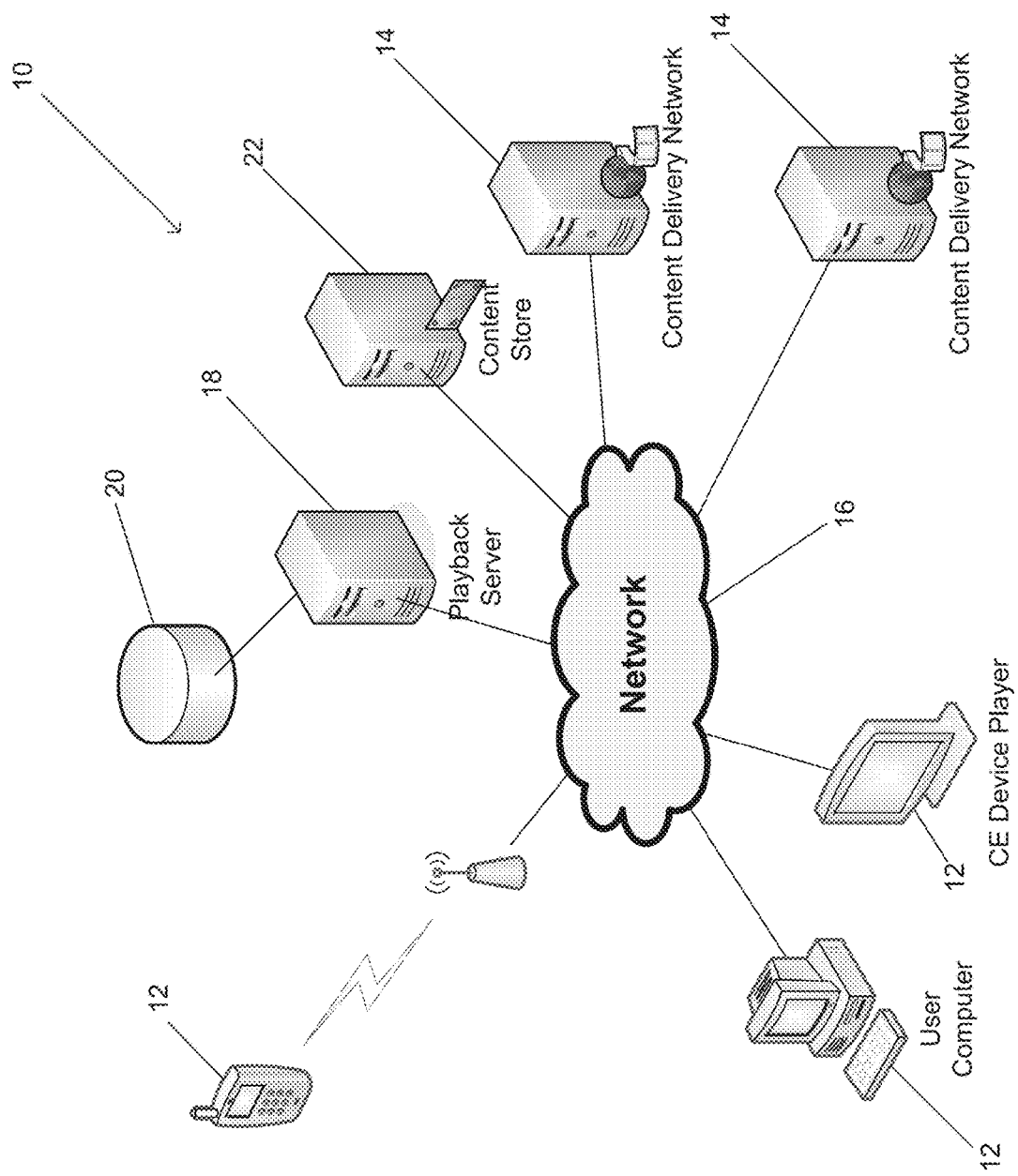
FIG. 1 is a network diagram of a streaming system including a playback server in accordance with an embodiment of the invention.

Adaptive bitrate streaming systems in accordance with many embodiments of the invention include a playback server that automatically generates top level index files in response to requests from playback devices. A streaming system in accordance with an embodiment of the invention is illustrated in FIG. 1. The streaming system 10 includes a number of playback devices 12 configured to request streaming of content from remote servers within content delivery networks (CDNs) 14 via a network 16 such as the Internet. In order to stream content, the playback device obtains a top level index file that is automatically generated by the playback server 18 using a database 20 of available assets (i.e. container files containing streams of content associated with specific titles) and a set of predetermined filters or criteria.

To perform adaptive bitrate streaming, the playback devices 12 select content from different alternative streams described in the top level index file. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. In many embodiments, the top level index file generated by the playback server 18 describes at least the maximum bitrates of each of the alternative streams. The playback device can select one or more streams for conventional streaming or can switch between alternative streams to perform adaptive bitrate streaming.

In several embodiments, playback devices 12 are able to purchase content for streaming via one or more online content stores 22. In many instances, the playback device purchases content via an online content store and receives an electronic token or ticket that the playback device can provide to the playback server 18 to obtain access to the purchased content. When the playback server 18 receives the ticket, the playback server automatically generates a top level index file for the playback device using information stored in the database 20. The playback server is typically a conventional server system configured using a playback management application and in such a way that the playback server can access the database 20. In a number of embodiments, playback devices 12 provide information concerning their playback capabilities to the playback server 18 and the server automatically generates top level index files by filtering assets associated with a purchased piece of content based upon device capabilities. Such capabilities include but are not limited to playback capabilities, display aspect ratio, and/or anticipated maximum network connection data rate. In a number of embodiments, the capabilities of a specific playback device 12 are communicated to the playback server 18 in the form of a product identifier or product ID. The playback server 18 can maintain a database of product IDs and associated device capabilities, and can utilize the product IDs provided by playback devices to retrieve the associated device capabilities and apply filters to lists of available assets when generating a top level index file. Systems and methods for assigning product IDs and associating them with information concerning the capabilities of the devices to which the product IDs are assigned are described in U.S. Provisional Patent Application Ser. No. 61/581,598 to Grab et al., entitled "Systems and Methods for Identifying Consumer Electronic Products Using a Playback Device with a Product Identifier", filed Dec. 29, 2011. The disclosure of U.S. Provisional Patent Application Ser. No. 61/581,598 is incorporated by reference herein in its entirety. Other filters that can be applied by playback servers in accordance with embodiments of the invention include (but are not limited to) filters based upon the location of the playback device (i.e. country/region), and languages associated with a specific user. Various filters that can be applied to generate a top level index file in accordance with embodiments of the invention are discussed further below.

When the playback server 18 receives a play request, the playback server retrieves cryptographic information required to playback protected streams of content. The playback device can then request portions of container files containing streams of content from one or more servers within a content delivery network 14 and can use the cryptographic information to access protected content. Systems and methods for the digital rights management of protected streams used in adaptive bitrate streaming are described in U.S. patent application Ser. No. 13/340,623 to Kiefer et al., entitled "Systems and Methods for Playing Back Alternative Streams of Protected Content Protected Using Common Cryptographic Information", filed Dec. 29, 2011. The disclosure of U.S. patent application Ser. No. 13/340,623 is incorporated by reference herein in its entirety.

During playback, playback devices 12 can provide play event reports to the playback server 18. The play event reports can include information including (but not limited to) the current stream(s) from which the playback device is requesting data and the current playback location of the playback device. In many embodiments, the playback server 18 responds to the play event reports by instructing the playback device to continue playback or to cease playback. In several embodiments, the playback server enforces concurrency limits on playback devices. The term concurrency limit in the context of adaptive bitrate streaming systems describes the number of playback devices that can simultaneously playback content associated with a specific user account. When a concurrency limit is exceeded, the playback server 18 can send an instruction to a playback device 12 directing it to cease playback. In a number of embodiments, playback location information provided in play event reports can be utilized to enable a user to switch from playing back content on a first device to playing back content on a second device and the second device will automatically resume content playback at the last playback location of the first playback device. In addition, a user that suspends playback on a first playback device can resume playback on the same playback device or a second playback device at some later point in time.

Although a specific streaming system is illustrated in FIG. 1, playback servers that automatically generate top level index files can be incorporated into any of a variety of streaming system architectures in accordance with embodiments of the invention. Playback devices that can be utilized to perform network bandwidth measurements during a streaming session in accordance with embodiments of the invention are discussed further below.

Playback Devices

Figure 2:
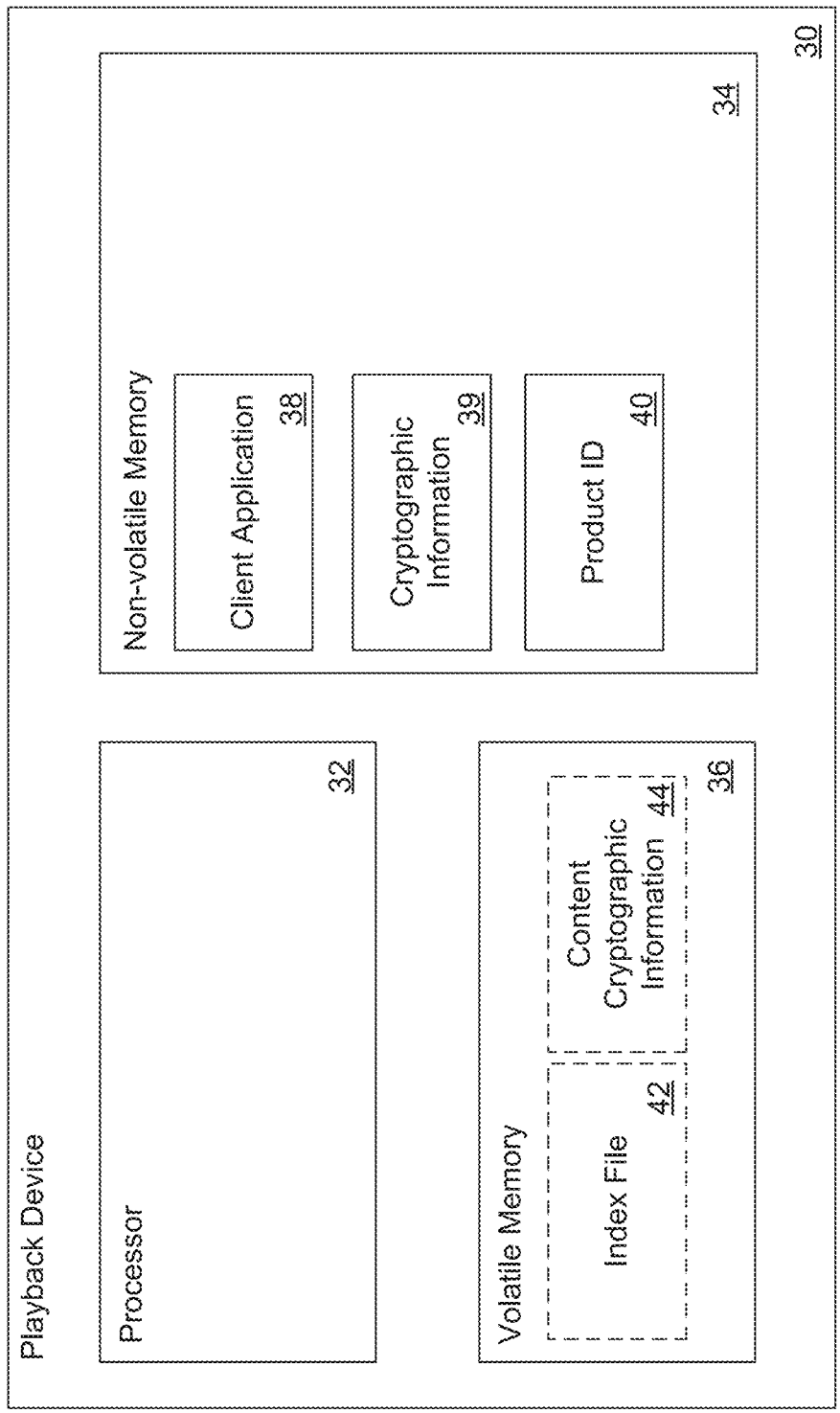
FIG. 2 is a system diagram of a playback device in accordance with an embodiment of the invention.

In the embodiment illustrated in FIG. 1, playback devices include personal computers, CE players, and mobile phones. In other embodiments, playback devices can include consumer electronics devices such as DVD players, Blu-ray players, televisions, set top boxes, video game consoles, tablets, and other devices that are capable of connecting to a server and playing back encoded media. The basic architecture of a playback device in accordance with an embodiment of the invention is illustrated in FIG. 2. The playback device 30 includes a processor 32 in communication with non-volatile memory 34 and volatile memory 36. In the illustrated embodiment, the non-volatile memory includes a client application 38 that configures the processor and the playback device to stream content from a remote server. The non-volatile memory 34 also includes device cryptographic data 39 that can be utilized in accessing encrypted content and a product ID 40 that can be utilized to identify the capabilities of the playback device.

During operation, the client application 38 can configure the playback device to purchase content from a content store and request a top level index file 42 from a playback server. As noted above, the request for a top level index file can include the product ID 40 of the playback device, which can be used to filter the assets that are described in the top level index file. When the top level index file 42 is received from the playback server, the client application 38 configures the playback device to store the top level index file 42 in memory 36 and request content cryptographic information 44 to playback requested streams from the playback server (or a separate DRM server) in response to a user instruction to playback content. The content cryptographic information 44 received from the playback server can also be stored in memory 36. The client application 38 can then configure the playback device 30 to playback content by requesting portions of container files containing content from a server within a content delivery network. The specific container files selected by the client application 38 can be determined based upon the information available to the client application within the top level index file 42. When the playback device receives the requested portions of the container files, the client application 38 can access protected content within the requested portions of the container files using the content cryptographic information 44. The client application can continue to request and playback content from different container files depending upon the prevailing streaming conditions until a user instruction suspending playback is received or until playback completes.

Although a specific playback device architecture is illustrated in FIG. 2, any of a variety of architectures including architectures where the client application is located on disk or some other form of storage and is loaded into volatile memory at runtime can be utilized to implement playback devices for use in adaptive bitrate streaming systems in accordance with embodiments of the invention. Furthermore, any of a variety of system architectures including (but not limited) to the system architecture illustrated in FIG. 1 can be utilized to perform adaptive bitrate streaming using top level index files that are automatically generated in response to request from playback devices in accordance with embodiments of the invention.

Content Playback

Figure 3:
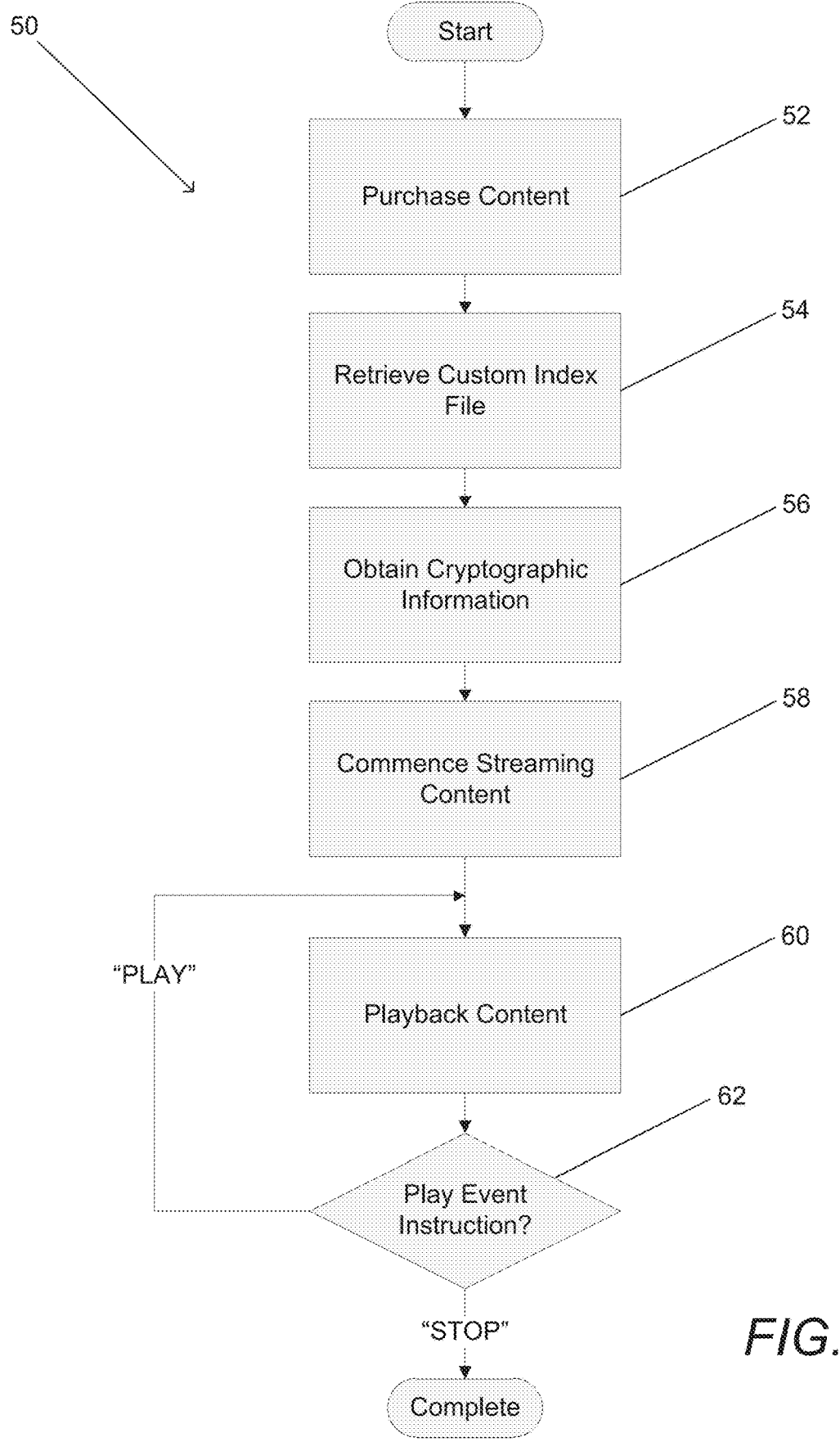
FIG. 3 is a flow chart illustrating a process for obtaining a top level index file and cryptographic information from a playback server to stream content from a content distribution network in accordance with an embodiment of the invention.

A process for playing back content using a top level index file generated in response to a request from a playback device in accordance with an embodiment of the invention is illustrated in FIG. 3. The process 50 includes purchase (52) of content. The purchase can be performed using a playback device or can be performed using another device. In many embodiments, the purchase is made via an online content store that provides an electronic ticket or token that can be utilized to obtain access to the content. In order to access the content, the playback device requests the generation of a top level index file customized for the specific playback device from a playback server. In many embodiments, the top level index file is customized in the sense that the playback server filters all available assets to generate a top level index file that describes the assets that are available and/or best suited to playback by the playback device. Once the custom top level index file is retrieved (54), the playback device obtains (56) cryptographic information that enables playback of protected streams identified within the top level index file. In many embodiments, playback devices wait until a playback request is received from a user and then requests cryptographic information from the playback server.

When a playback device possesses a top level index file and any necessary cryptographic information, the playback device can commence streaming (58) content by requesting portions of one or more container files containing encoded media. Any of a variety of processes can be utilized to select initial streams including (but not limited to) selecting the lowest bitrate streams, performing a bandwidth probe in a manner similar to the manner disclosed in U.S. patent application Ser. No. 13/251,061 to van der Schaar et al., entitled "Systems and Methods for Determining Available Bandwidth and Performing Initial Stream Selection When Commencing Streaming Using Hypertext Transfer Protocol", filed Sep. 30, 2011, or estimating available bandwidth using another technique. The disclosure of U.S. patent application Ser. No. 13/251,061 is incorporated by reference herein in its entirety.

Once playback commences (60), adaptive bitrate streaming can be performed. During playback, play event reports can be provided to a playback server to provide information concerning the playback status of the playback device periodically or in response to various events including (but not limited to) user instructions received by the playback device. When a play event report is provided to the playback server, the playback server can provide a play event instruction to the playback device. In the illustrated embodiment, the play event instructions that can be received (62) by the playback device including a "PLAY" instruction to continue playback and a "STOP" instruction to cease playback. As is discussed further below, the ability of a playback server to stop playback on a playback device enables the playback device to enforce concurrency requirements across multiple playback devices associated with a user. The combination of the play event reports and the event playback instructions can also be utilized by the playback server to enable a second playback device to resume playback of content at the last playback location reported by a first playback device. In this way, a user can seamlessly move between playback devices without the need to seek to a location to continue playback.

Although a specific process is illustrated in FIG. 3, any of a variety of processes can be utilized for requesting a customized top level index file and playing back content in accordance with embodiments of the invention. Playback servers and processes for automatically generating index files in accordance with embodiments of the invention are Automatic Generation of Top Level Indexes Playback servers in accordance with embodiments of the invention maintain a database of assets associated with specific pieces of content and can be configured by a playback management application to retrieve and filter information concerning assets to automatically generate a top level index file for a specific playback device. The databases maintained by the playback servers can list the name of the file containing the asset, and the content delivery network(s) on which the asset is located. When the asset is a video stream, the database can describe characteristics of the video stream including (but not limited to) a language associated with the video stream, the maximum bitrate at which the video stream is encoded, the frame rate of the video stream, the resolution and/or sample aspect ratio of the video stream. When the asset is an audio stream, the database can describe characteristics of the audio stream including (but not limited to) the language of the audio stream, the encoding of the audio stream and the bandwidth requirements of the audio stream. When the asset is a subtitle stream, the database can describe characteristics of the subtitle stream including (but not limited to) the language of the subtitle stream, the encoding of the subtitle stream and the bandwidth requirements of the subtitle stream. In addition to maintaining information concerning assets, the playback device can maintain information concerning playback capabilities of playback devices. In a number of embodiments, the information concerning playback capabilities of different playback devices is indexed using a product ID. In many embodiments, the playback device also maintains information concerning rules regulating the usage of different assets based upon criteria including (but not limited to) the type of playback device, the playback capabilities of a playback device, the location of the playback device (e.g. country/region), and/or requested language(s). Although specific pieces of information are described above as being associated in a database maintained by a playback server, any of a variety of pieces of information can be maintained in any of a variety of data structures to enable generation of a top level index file by a playback server in accordance with an embodiment of the invention. As is discussed further below, the information maintained by the playback server can be filtered in real time in response to a request for a top level index file from a playback device to generate a top level index file that only includes links to the assets that the playback device is permitted to playback.

Figure 4:
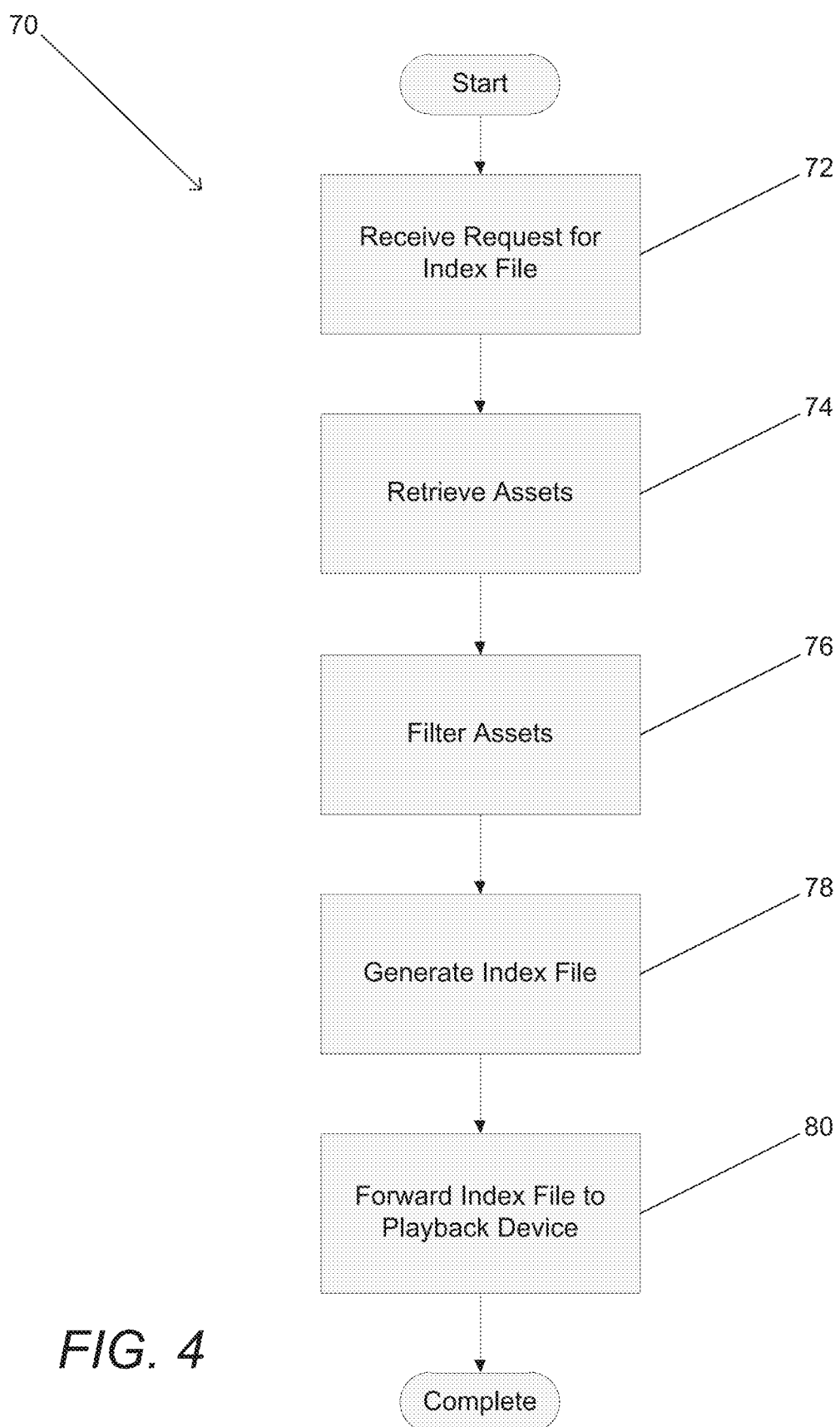
FIG. 4 is a flow chart illustrating a process for automatically generating a top level index file in accordance with an embodiment of the invention.

A process for generating a top level index file using information concerning assets associated with specific pieces of content maintained by a playback server in accordance with an embodiment of the invention is illustrated in FIG. 4. In the illustrated embodiment, the process 70 commences when the playback server receives (72) a request for a top level index file with respect to a specific piece of content from a specific playback device. As discussed above, the request can include information describing the playback device including (but not limited to) the playback capabilities of the playback device, a user account to which the playback device is registered, and information indicative of the geographic location of the playback device (e.g. the I.P. address of the playback device). In many embodiments, the capabilities of the playback device are identified using a product ID, which is associated with specific playback capabilities in a database accessible to the playback server.

The playback server retrieves (74) assets associated with the requested piece of content. The playback server filters (76) the assets based upon one or more filters associated with the capabilities of the playback device, the preferences of the user, and the requirements of the content owner. Accordingly, different top level index files can be generated with respect to the same content dependent on factors including (but not limited to) differences in playback capabilities between devices, differences in geographic location, and/or differences in language preferences associated with the playback devices. Processes for retrieving and filtering assets associated with a specific piece of content in accordance with an embodiment of the invention are discussed further below. Following filtering, the remaining assets can be utilized to generate (78) the top level index file, which can be provided (80) to the playback device. In a number of embodiments, the top level index file is securely forward using a secure communication technique including but not limited to Secure Socket Layer (SSL) communication or an equivalent secure communication protocol.

Although a specific process for generating a top level index file in accordance with an embodiment of the invention is illustrated in FIG. 4, any of a variety of processes involving collecting information concerning assets associated with a specific piece of content and generating an index file that indexes the assets that are to be made available to a playback device by an adaptive bitrate streaming system can be utilized in accordance with embodiments of the invention. Specific processes for filtering the assets that are included in a top level index file in accordance with embodiments of the invention are discussed below.

Filtering Assets for Inclusion in Top Level Index Files

Typically, more assets or streams are created than are necessary for adaptive bitrate streaming of content by a playback device. In many instances, video streams are created for different classes of playback device. For example, lower bitrate streams can be created for devices that will stream content over cellular data networks and higher bitrate streams can be created for devices that will stream content over a home network connected to the Internet via a high speed Internet connection. In addition, different video streams can be created with different aspect ratios and different audio streams can be created for different languages. In several embodiments, content stores offer premium high resolution content and a playback device that has only purchased lower resolution content is not permitted to access high resolution content. In many embodiments, specific streams may not be accessible in geographic regions. When a top level index file is created in real time in response to a request from a specific playback device, the playback server that creates the top level index file can initially gather information concerning the assets associated with a specific piece of content or title. The playback server can then apply one or more filters to the list of available assets to produce a list of assets that satisfies criteria including (but not limited to) criteria with respect to the capabilities of the playback device, the preferences of the user, and/or the requirements of the content owner.

Figure 5:
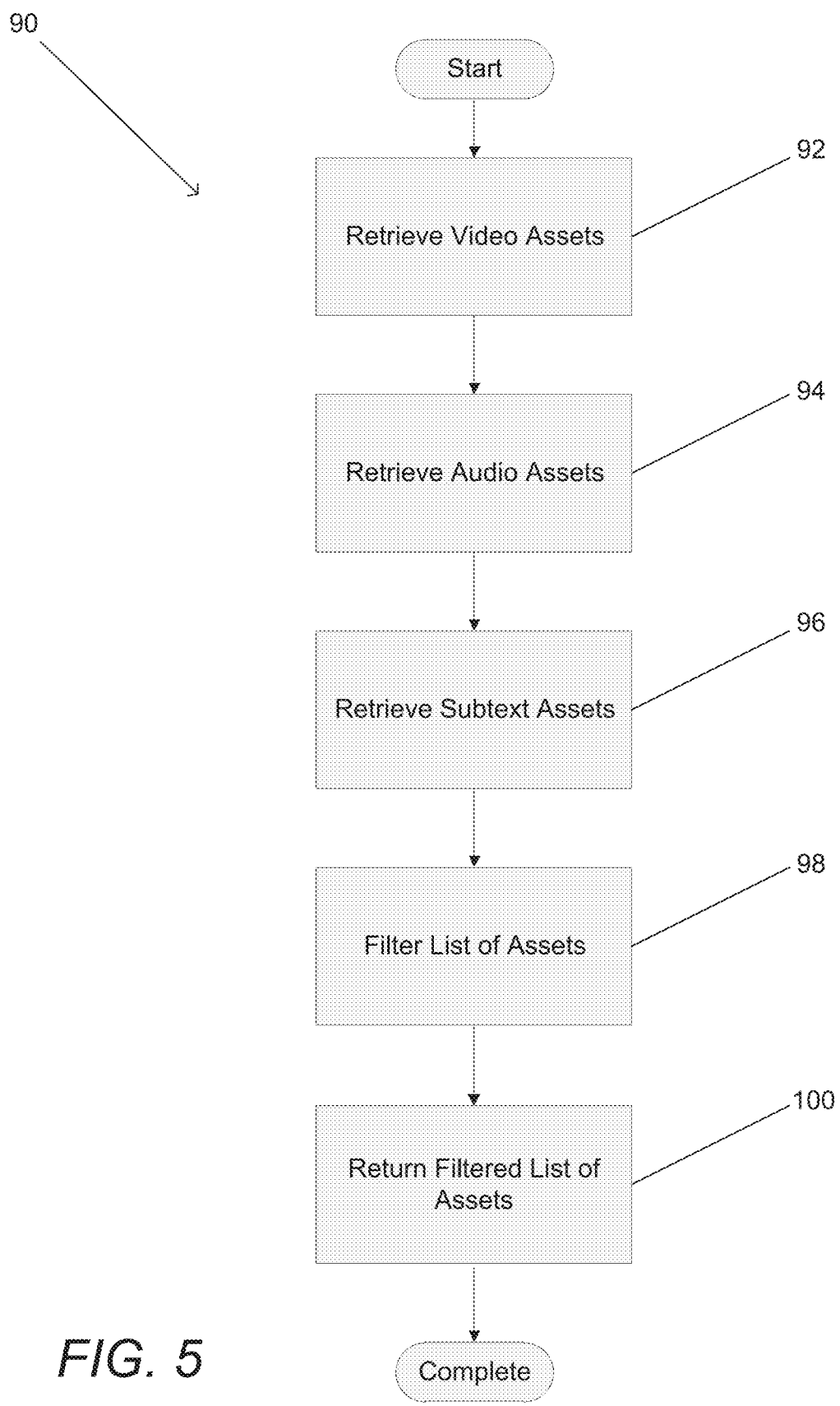
FIG. 5 is a flow chart illustrating a process for generating a list of streams for inclusion in an automatically generated top level index file in accordance with an embodiment of the invention.

A process for producing a list of assets to which a playback device is granted access in accordance with an embodiment of the invention is illustrated in FIG. 5. The process 90 includes retrieving video (92), audio (94), and/or subtitle or subtext (96) assets. In many embodiments, the process can also include retrieving other types of assets including (but not limited to) metadata assets and/or trick play stream assets. When the assets associated with a piece of content have been retrieved, the playback server can filter (98) the assets to exclude assets that are not capable of being played back by the playback device, not permitted to be played back, or are not desired to be played back.

The information concerning assets associated with the content collected by the playback server can include information concerning assets that are both capable of being played back by the playback device and permitted to be played back by the content owner. However, the information may also include information concerning assets that the playback device is not permitted to playback, or assets that are not desired for playback by the user. Assets that may not be permitted for playback can include (but are not limited to) premium content assets that have not been purchased (e.g. a high definition video stream) or assets that are not permitted to be played back within a specific geographic location or region, assets that the playback device is incapable of playing back including (but to limited to) streams encoded in unsupported formats or using profiles and/or buffer sizes that are not supported by the playback device, or assets that the playback device is not securely capable of playing back (e.g. the playback device has an unencrypted digital output and a content provider is not willing to allow high definition content to be streamed to such a device). Assets that a user may not wish to playback include (but is not limited to) content in a language that is not relevant to a specific user, video assets having an aspect ratio that is not the same as the display aspect ratio of the playback device (where video assets are associated with the content that have the same aspect ratio as the device's display aspect ratio), content encoded at a resolution beyond the resolution of the playback device's display, and/or content encoded at a maximum bitrate exceeding the maximum data rate of the playback device's network connection. Although specific filters are discussed above, the criteria utilized by a playback server to filter (98) the initial list of assets to generate a list of assets for inclusion in a top level index file are only limited by the requirements of a specific adaptive bitrate streaming system.

Once filtering has been applied to the list of assets, a filtered list of assets can be returned (100) and used to generate a top level index file. In the illustrated embodiment, the filtered list of assets corresponds to the content streams that the playback server is permitting the playback device to access.

Although a specific process is illustrated in FIG. 5, any of a variety of processes can be utilized to retrieve and filter the assets that will be included in a top level index file as appropriate to the requirements of a specific application in accordance with an embodiment of the invention.

Generating a Top Level Index SMIL File

In a number of embodiments, the top level index file generated by a playback server in response to a request from a playback device is a SMIL file, which is an XML file that includes a list of URIs describing each of the streams and the container files that contain the streams. The URI can include information such as the "system-bitrate" of the stream contained within the stream and information concerning the location of specific pieces of data within the container file.

The basic structure of a SMIL file involves providing an XML declaration and a SMIL element. The SMIL element defines the streams or assets available for by the playback device and includes a HEAD element, which is typically left empty and a BODY element that typically only contains a PAR (parallel) element. The PAR element describes streams that can be played simultaneously (i.e. include media that can be presented at the same time).

The SMIL specification defines a number of child elements to the PAR element that can be utilized to specify the streams available for use in adaptive bitrate streaming. The VIDEO, AUDIO and TEXTSTREAM elements can be utilized to define a specific video, audio or subtitle stream. The VIDEO, AUDIO and TEXTSTREAM elements can collectively be referred to as media objects. The basic attributes of a media object are the SRC attribute, which specifies the full path or a URI to a container file containing the relevant stream, and the XML:LANG attribute, which includes a 3 letter language code. Additional information concerning a media object can be specified using the PARAM element. The PARAM element is a standard way within the SMIL format for providing a general name value pair. In a number of embodiments of the invention, specific PARAM elements are defined that are utilized during adaptive bitrate streaming.

In many embodiments, a "header-request" PARAM element is defined that specifies the size of the header section of the container file containing the stream. The value of the "header-request" PARAM element typically specifies the number of bytes between the start of the file and the start of the encoded media within the file. In many embodiments, the header contains information concerning the manner in which the media is encoded and a playback device retrieves the header prior to playback of the encoded media in order to be able to configure the decoder for playback of the encoded media. An example of a "header-request" PARAM element is as follows:

```
<param
    name="header-request"
    value="1026"
    valuetype="data" />
```

In a number of embodiments, a "mime" PARAM element is defined that specifies the MIME type of the stream. A "mime" PARAM element that identifies the stream as being an H.264 stream (i.e. a stream encoded in accordance with the MPEG-4 Advanced Video Codec standard) is as follows:

```
<param
    name="mime"
    value="V_MPEG4/ISO/AVC"
    valuetype="data" />
```

The MIME type of the stream can be specified using a "mime" PARAM element as appropriate to the encoding of a specific stream (e.g. AAC audio or UTF-8 text stream).

When the media object is a VIDEO element, additional attributes are defined within the SMIL file format specification including the systemBitrate attribute, which specifies the bitrate of the stream in the container file identified by the VIDEO element, and width and height attributes, which specify the dimensions of the encoded video in pixels. Additional attributes can also be defined using the PARAM element. In several embodiments, a "vbv" PARAM element is defined that specified the VBV buffer size of the video stream in bytes. The video buffering verifier (VBV) is a theoretical MPEG video buffer model used to ensure that an encoded video stream can be correctly buffered and played back at the decoder device. An example of a "vbv" PARAM element that specifies a VBV size of 1000 bytes is as follows:

```
<param
    name="vbv"
    value="1000"
    valuetype="data" />
```

An example of VIDEO element including the attributes discussed above is as follows:

```
<video
    src="http://cnd.com/video1_620kbps.mkv"
    systemBitrate="620"
    width="480"
    height="270" >
    <param
        name="vbv"
        value="1000"
        valuetype="data" />
</video>
```

Adaptive bitrate streaming systems in accordance with embodiments of the invention can support trick play streams, which can be used to provide smooth visual search through source content encoded for adaptive bitrate streaming. A trick play stream can be encoded that appears to be an accelerated visual search through the source media when played back, when in reality the trick play stream is simply a separate track encoding the source media at a lower frame rate. In many embodiments of the system, a VIDEO element that references a trick play track is indicated by the systemBaseProfile attribute of the VIDEO element. In other embodiments, any of a variety of techniques can be utilized to signify within the top level index file that a specific stream is a trick play stream. An example of a trick play stream VIDEO element in accordance with an embodiment of the invention is as follows:

```
<video
    src="http://cnd.com/video_test2_600kbps.mkv"
    systemBaseProfile="DivXPiusTrickTrack"
    width="480"
    height="240">
```

```
    <param name="vbv" value="1000" valuetype="data" />
    <param name="header-request" value="1000" valuetype="data" />
</video>
```

In a number of embodiments of the invention, a "reservedBandwidth" PARAM element can be defined for an AUDIO element. The "reservedBandwidth" PARAM element specifies the bitrate of the audio stream in Kbps. An example of an AUDIO element specified in accordance with an embodiment of the invention is as follows:

```
<audio
    src="http://cnd.com/audio_test1_277kbps.mkv"
    xml:lang="gem"
    <param
        name="reservedBandwidth"
        value="128"
        valuetype="data" />
/>
```

In several embodiments, the "reservedBandwidth" PARAM element is also defined for a TEXTSTREAM element. An example of a TEXTSTREAM element including a "reservedBandwidth" PARAM element in accordance with an embodiment of the invention is as follows:

```
<textstream
    src="http://cnd.com/text_stream_ger.mkv"
    xml:lang="gem"
    <param
        name="reservedBandwidth"
        value="32"
        valuetype="data" />
/>
```

In other embodiments, any of a variety of mechanisms can be utilized to specify information concerning VIDEO, AUDIO, and SUBTITLE elements as appropriate to specific applications.

A SWITCH element is a mechanism defined within the SMIL file format specification that can be utilized to define adaptive or alternative streams. An example of the manner in which a SWITCH element can be utilized to specify alternative video streams at different bitrates is as follows:

```
<switch>
    <video src="http://cnd.com/video_test1_300kbps.mkv"/>
    <video src="http://cnd.com/video_test2_900kbps.mkv"/>
    <video src="http://cnd.com/video_test3_1200kbps.mkv"/>
</switch>
```

The SWITCH element specifies the URLs of three alternative video streams. The file names indicate that the different bitrates of each of the streams. As is discussed further below, the SMIL file format specification provides mechanisms that can be utilized in accordance with embodiments of the invention to specify within the top level index SMIL file additional information concerning a stream and the container file in which it is contained.

In many embodiments of the invention, the EXCL (exclusive) element is used to define alternative tracks that do not adapt during playback with streaming conditions. For example, the EXCL element can be used to define alternative audio tracks or alternative subtitle tracks. An example of the manner in which an EXCL element can be utilized to specify alternative English and French audio streams is as follows:

```
<excl>
    <audio
        src="http://cnd.com/english-audio.mkv"
        xml:lang="eng"/>
    <audio
        src="http://cnd.com/french-audio.mkv"
        xml:lang="fre"/>
</excl>
```

An example of a top level index SMIL file that defines the attributes and parameters of two alternative video levels, an audio stream and a subtitle stream in accordance with an embodiment of the invention is as follows:

When the playback device receives a top level index SMIL file, the playback device can parse the SMIL file to identify the available streams. The playback device can then select initial stream and can use the SMIL file to identify the portions of the container file to download to obtain information concerning the encoding of a specific stream and/or to obtain an index to the encoded media within the container file.

Figure 6:
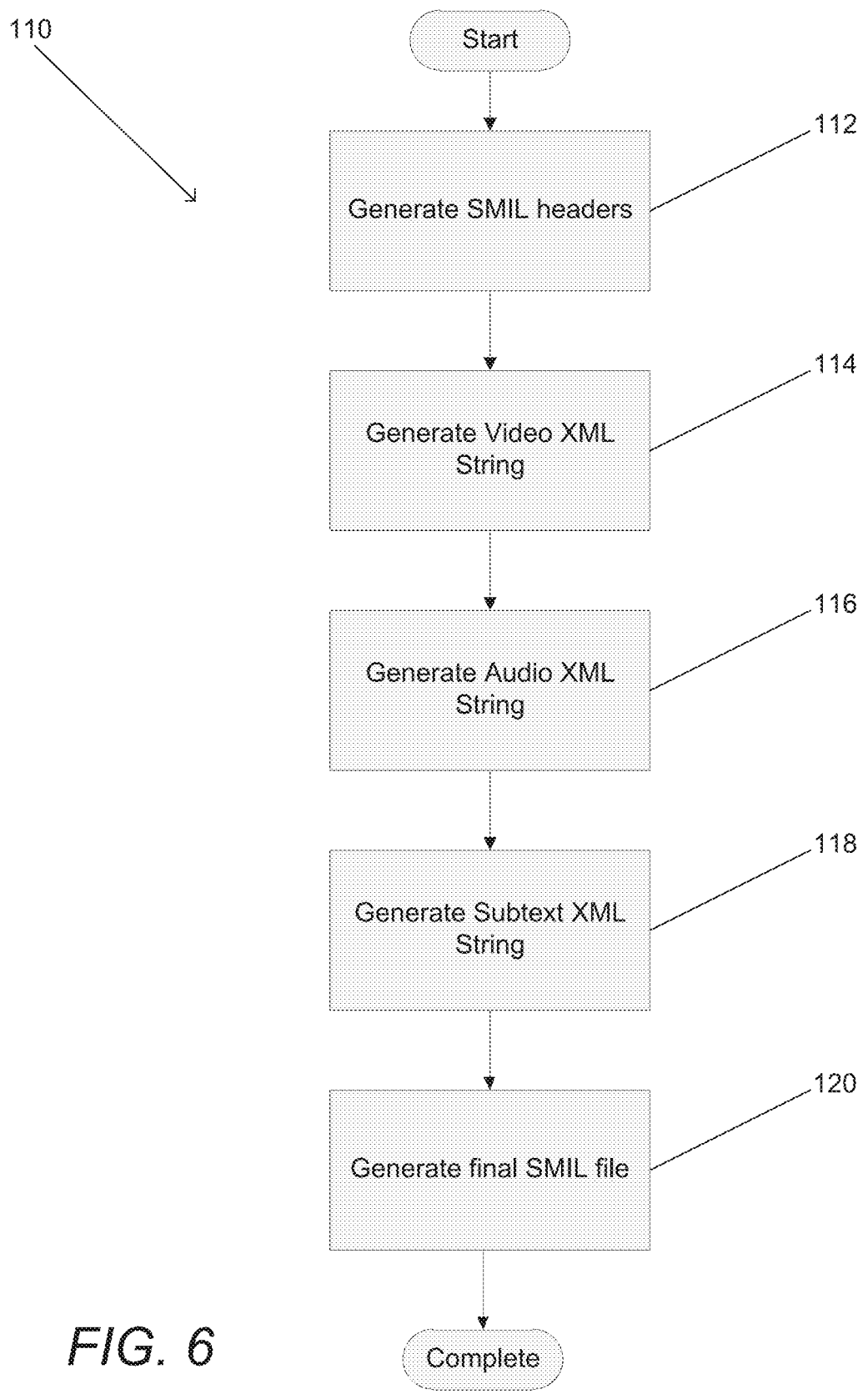
FIG. 6 is a flow chart illustrating a process for generating a SMIL file containing a top level index in accordance with an embodiment of the invention.

A process for building a top level index SMIL file in accordance with an embodiment of the invention is illustrated in FIG. 6. The process 110 involves generating (112) headers for the SMIL file, and generating XML strings for the video (114), audio (116), subtitle/subtext (118) and/or any other assets (e.g. trick play streams, metadata streams) that are in the list of assets that the playback server is

```
<?xml version="1.0" encoding="utf-8"?>
<smil xmlns="http://www.w3.org/ns/SMIL" version="3.0" baseProfile="Language">
    <head>
    </head>
    <body>
        <par>
            <switch>
                <video
                    src="http://cnd.com/video_test1_300kbps.mkv"
                    systemBitrate="300"
                    vbv="600"
                    width="320"
                    height="240" >
                    <param
                        name="vbv"
                        value="600"
                        valuetype="data" />
                    <param
                        name="header-request"
                        value="1000"
                        valuetype="data" />
                </video>
                <video
                    src="http://cnd.com/video_test2_600kbps.mkv"
                    systemBitrate="600"
                    vbv ="900"
                    width="640"
                    height="480">
                    <param
                        name="vbv"
                        value="1000"
                        valuetype="data" />
                    <param
                        name="header-request"
                        value="1000"
                        valuetype="data" />
                </video>
            </switch>
            <audio
                src="http://cnd.com/audio.mkv"
                xml:lang="eng">
                <param
                    name="header-request"
                    value="1000"
                    valuetype="data" />
                <param name="reservedBandwidth" value="128" valuetype="data" />
            </audio>
            <textstream
                src="http://cnd.com/subtitles.mkv"
                xml:lang="eng">
                <param
                    name="header-request"
                    value="1000"
                    valuetype="data" />
                <param name="reservedBandwidth" value="32" valuetype="data" />
            </textstream>
        </par>
    </body>
</smil>
``` permitting the playback device to access. At which point, the finalized SMIL file is generated (120).

An assetID is assigned to audio and text streams to uniquely identify the stream. This value is passed up to the server so the server knows the exact audio, subtitle stream being played.

```
<param
    name="assetID"
    value="123456"
    valuetype="data" />
```

Although top level index SMIL files are described above, any of a variety of top level index file formats can be utilized to automatically create top level index files for a specific playback device as appropriate to a specific application in accordance with embodiments of the invention. The use of top level index files to enable playback of encoded media using adaptive bitrate streaming in accordance with embodiments of the invention is discussed further below.

Protected Streams

Some or all of the assets associated with a specific piece of content may be encrypted or technically protected. Digital Rights Management (DRM) systems enable the communication of cryptographic information to playback devices so that the playback device can access protected streams in the clear (i.e. in an unencrypted form). DRM systems that can be utilized in adaptive bitrate streaming systems in accordance with embodiments of the invention are described in U.S. patent application Ser. No. 13/340,623. In many embodiments, the playback server acts as a DRM server. In several embodiments, the playback server is configured to obtain cryptographic information from the playback server.

Figure 7:
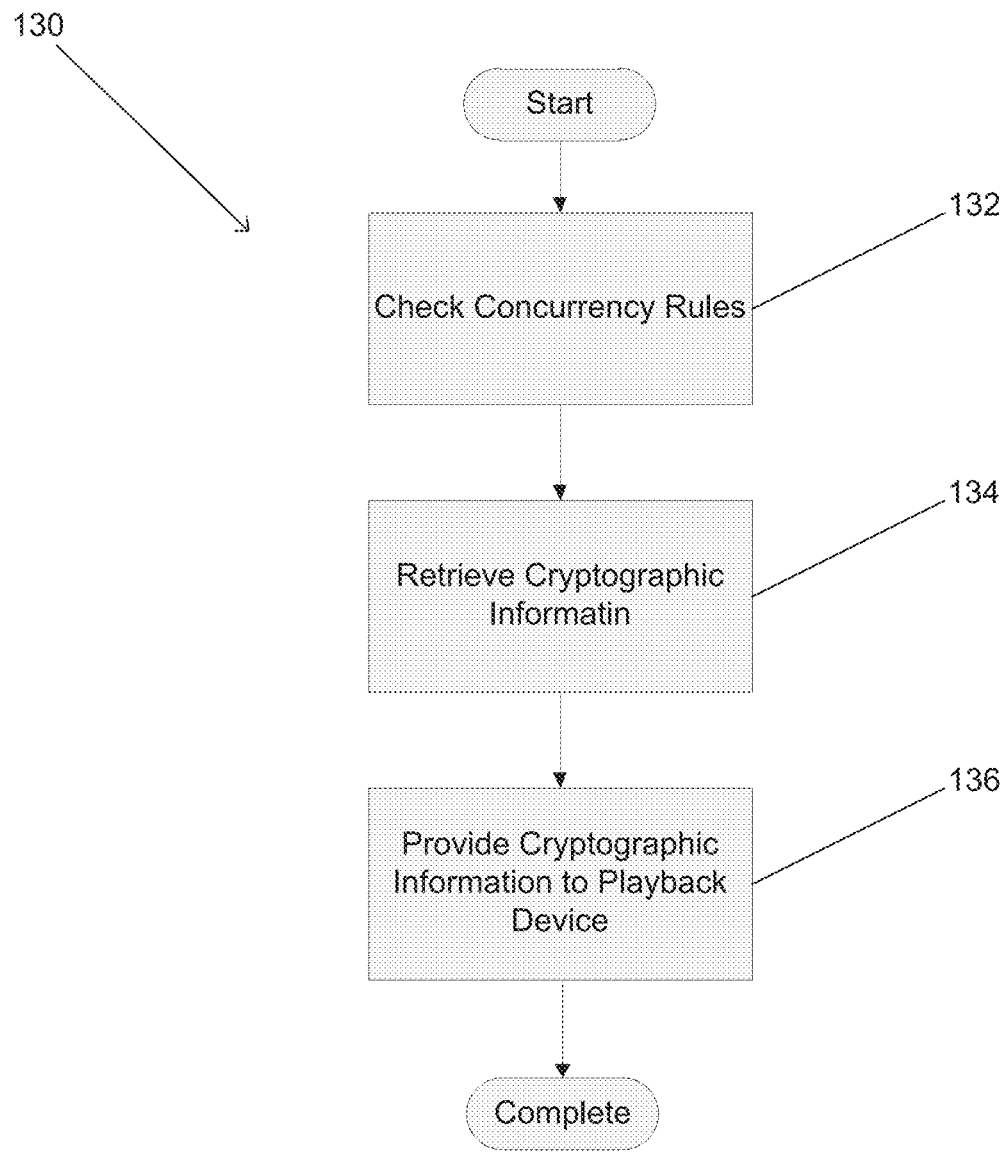
FIG. 7 is a flow chart illustrating a process for providing cryptographic information to a playback device in accordance with an embodiment of the invention.

A process for providing cryptographic information to a playback device in accordance with an embodiment of the invention is illustrated in FIG. 7. The process 130 includes checking (132) concurrency rules to confirm that the number of devices on which the user is currently playing back content and/or that have requested the right to playback the content is less than a predetermined concurrency limit. Assuming that the concurrency rules are satisfied, the process retrieves (134) cryptographic information enabling access to the protected streams associated with the specific piece of content being accessed by the playback device. A playback server can generate the cryptographic information or obtain the cryptographic information from a DRM server. The cryptographic information is then provided (136) to the playback device.

In many embodiments, the playback device includes cryptographic information that is locally stored on the playback device. The device cryptographic information is typically issued to the playback device at the time the playback device is first registered with the playback server and/or a DRM server. In several embodiments, the content cryptographic information provided to the playback device is encrypted so that it can be accessed using the playback device's device cryptographic information. In other embodiments, any of a variety of different techniques can be utilized to securely provide the playback device with cryptographic information to access protected streams.

Although a specific process for providing cryptographic information to a playback device in FIG. 7, any of a variety of processes can be utilized in accordance with embodiments of the invention. In addition, the playback device can obtain cryptographic information from a DRM server in a process that is entirely independent from the playback server and/or the automatic generation of a top level index file. Once a playback device has the necessary cryptographic information to playback protected streams of content, the playback device can commence playback. During playback, the playback device can provide periodic play event reports to the playback server. The generation and handling of play event reports in accordance with embodiments of the invention are discussed further below.

Play Event Reports

Playback devices in accordance with embodiments of the invention can generate play event reports periodically and/or in response to specific events such as (but not limited to) receipt of user instructions (e.g. play, stop, pause commands). The information that can be included in an event report typically includes the streams being accessed by the playback device and the current playback location in one or more of the streams. In several embodiments, the event report includes (but is not limited to) the time, the audio, and/or subtitle assetIDs, and/or a bandwidth measurement. The playback location can be utilized to resume playback of the content. The server can utilize play events to perform a variety of functions including (but not limited to) enabling playback to shift from one device to another device. When a user commences playing content on a first device and then commences playback of the same content on a second device, the playback server can provide the second playback device with the current playback location from the most recent play event report from the first device. The second playback device can then use the playback location information to resume playback of the content. In this way, the user can seamlessly transition from viewing content on a first playback device to a second playback device.

Figure 8:
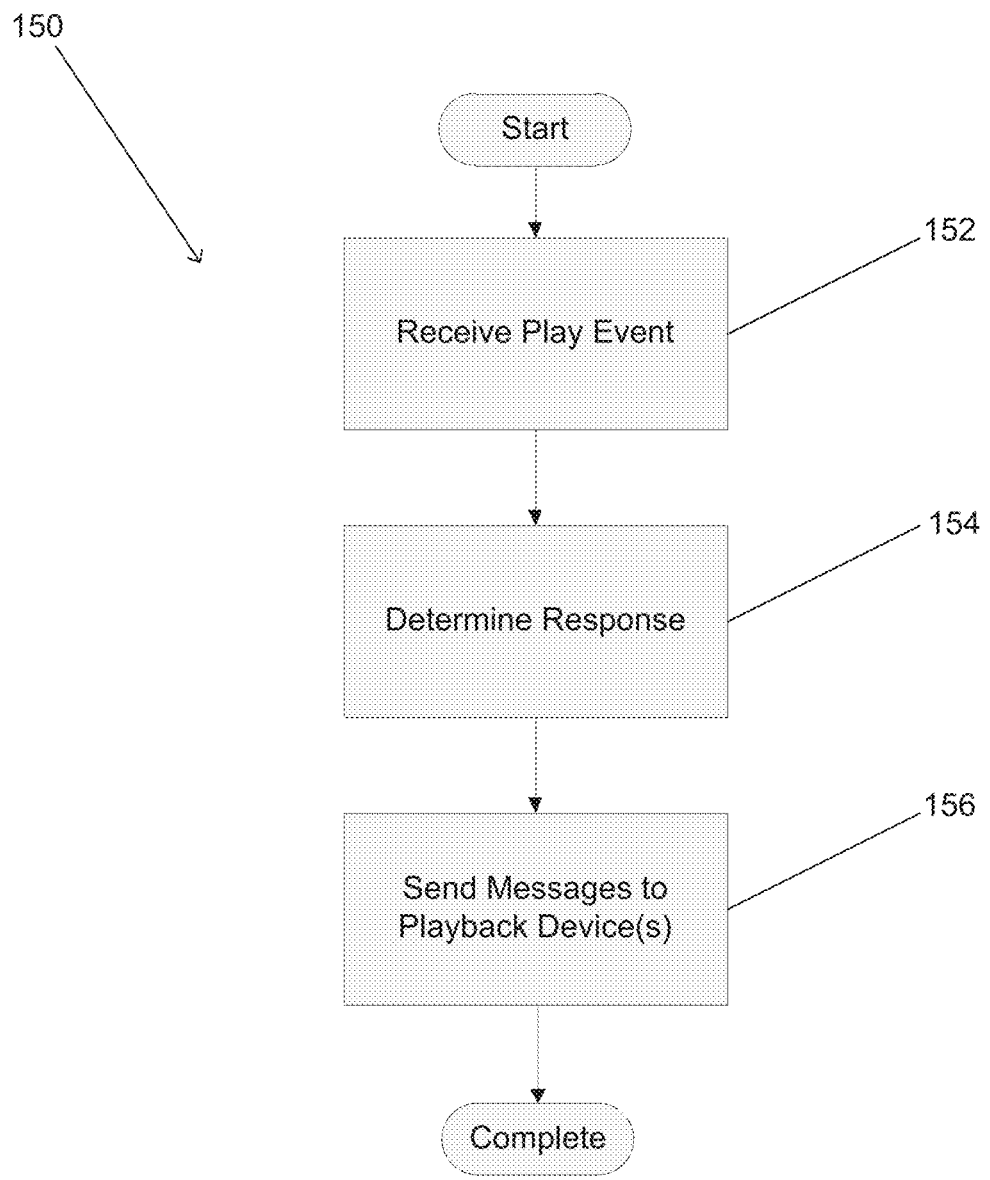
FIG. 8 is a flow chart illustrating a process for handling play events received from playback devices in accordance with an embodiment of the invention.

A process for handling play event reports in accordance with an embodiment of the invention is illustrated in FIG. 8. The process 150 includes receiving (152) play event reports and determining the appropriate response. In embodiments where there are concurrency limits, the response to a play event report may be to instruct the playback device to "STOP" playback of the content in response to a request to playback content on another device that exceeds a predetermined concurrency limit. Where the content is rented, the playback may exceed the rental period and the playback server can instruct the playback device to "STOP" playback. The playback server could also instruct the playback device to request content from alternative streams or to switch to accessing content on a different content delivery network, which may involve transmitting a new top level index file. In several embodiments, the playback server can instruct the playback device to display an error message or string. Typically, however, the response is to instruct the playback device to continue to play the content. The specific conditions under which a playback server will suspend playback or allow playback to continue are determined based upon the requirements of a specific application. The response is sent (156) to the playback device and the playback device manages playback accordingly.

Although a specific process for handling play event reports is illustrated in FIG. 8, any of a variety of process for handling play event reports appropriate to the requirements of a specific application can be utilized in accordance with embodiments of the invention.

Communicating During Adaptive Streaming

Figure 9:
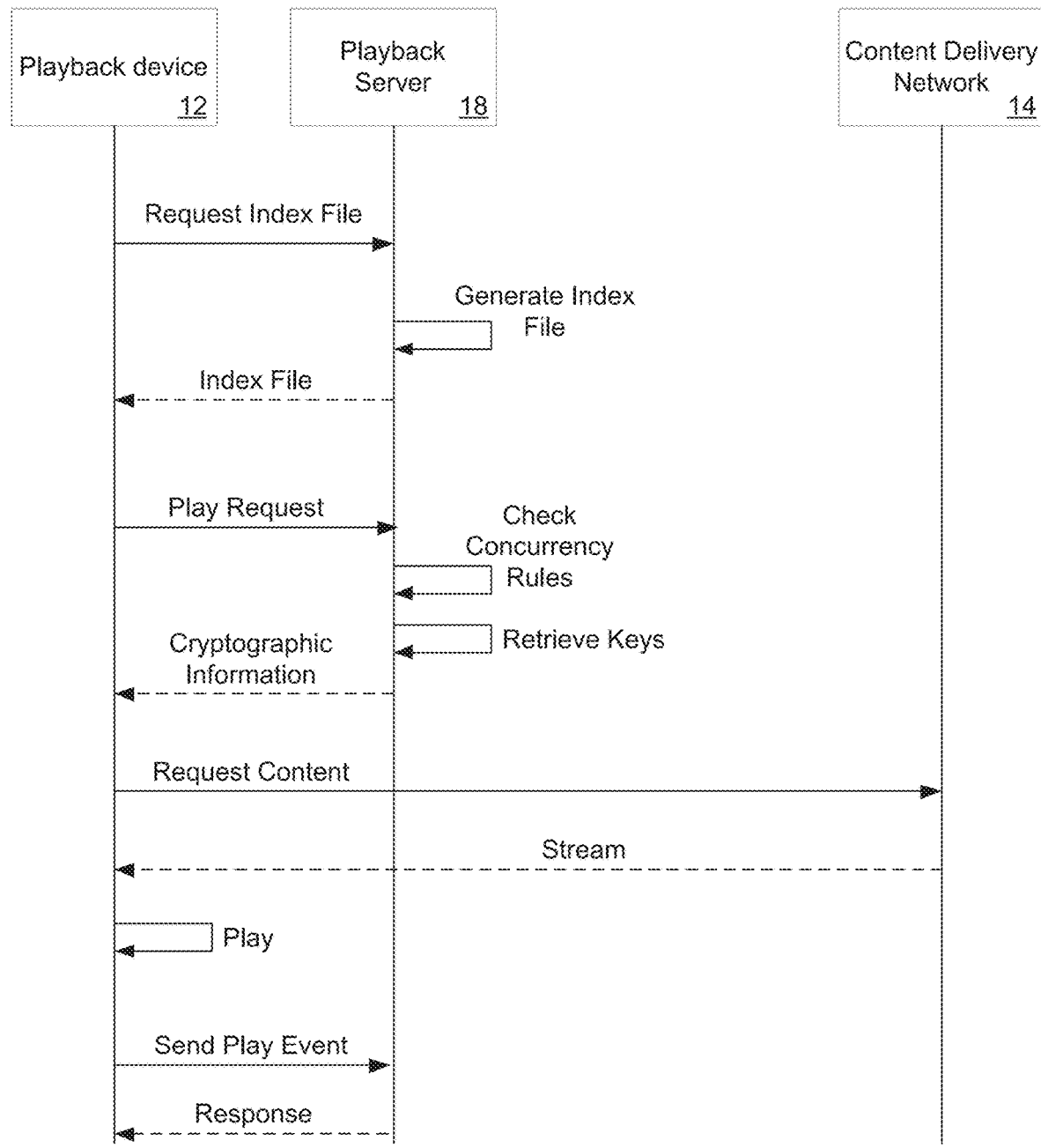
FIG. 9 is a timing diagram illustrating communication between a playback device and a playback server and a content distribution network during an adaptive bitrate streaming process that utilizes an automatically generated top level index file in accordance with an embodiment of the invention.

Processes are described above for automatically generating a top level index file in response to a request to access content from a playback device. A timing diagram illustrating communication between a playback device, a playback server, and a content delivery network during the adaptive bitrate streaming of content in accordance with an embodiment of the invention is illustrated in FIG. 9. The timing diagram shows a playback device 12 requesting an index file from a playback server 18. The playback server responds to the request by generating a top level index file using a process similar to the process outlined above. The playback server 18 provides the top level index file to the playback device 12, which then sends a playback request to the playback server. The playback server checks concurrency rules and retrieves cryptographic information enabling playback of protected streams. The cryptographic information is provided to the playback device 12. The playback device can then use the top level index file to request content from a content delivery network 14. In many embodiments, the playback device utilizes adaptive bitrate streaming to obtain the content from the content delivery network server(s). The playback device 12 can utilize the cryptographic information received from the playback server 18 to access protected streams of content in the clear and playback the content. During playback, the playback device 12 sends playback event reports to the playback server. The playback server 18 processes the play event report and sends a response to the playback device 12, which may cause the playback device to perform any of a variety of functions including (but not limited to) suspending playback of the content.

Although a specific sequence of communication is illustrated in FIG. 9, playback devices, playback servers, and content delivery networks can communicate in any of a variety of ways appropriate to a specific application in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed is:

1. A non-transitory machine readable medium containing processor instructions, where execution of the instructions by a processor causes the processor within a playback device to perform a process comprising:
   requesting a top level index file from a playback server using a playback device, where the request identifies a piece of content and includes request information comprising device information describing the playback device and user information describing a user associated with the request;
   receiving a top level index file from the playback server using the playback device, where the top level index file (i) describes at least a bitrate of each of a plurality of alternative streams of protected video content associated with the identified piece of content selected based upon the device information describing the playback device and an ability of the playback device to securely play back the protected video content, (ii) identifies the location of the each of the plurality of alternative streams of protected video content, where each of the plurality of alternative streams of protected video content encodes the piece of content at a different bitrate, and (iii) identifies common cryptographic information for accessing the protected video content;
   selecting an initial stream of protected video content from the plurality of alternative streams of protected video content using the playback device;
   requesting at least a portion of the initial stream of protected video content from the location identified in the top level index file made by the playback device;
   receiving the requested at least a portion of the initial stream of protected video content at the playback device;
   prior to receiving the requested at least a portion of the initial stream, requesting the common cryptographic information to access the initial stream of protected video content using the playback device from a digital rights management server;
   receiving the requested common cryptographic information at the playback device, where the received common cryptographic information is encrypted;
   accessing the received common cryptographic information securely;
   decrypting the received portion of the initial stream of protected video content using the accessed common cryptographic information; and
   playing back the decrypted video content using the playback device.

2. The non-transitory machine readable medium of claim 1, wherein the plurality of alternative streams includes only streams that the playback device is capable of playing back.

3. The non-transitory machine readable medium of claim 1, wherein the device information includes information indicative of the geographic location of the playback device.

4. The non-transitory machine readable medium of claim 1, wherein the top level index file is a SMIL file.

5. The non-transitory machine readable medium of claim 1, wherein the top level index file describes each of the plurality of alternative streams of protected video content using a plurality of elements including a URI identifying the location of the stream of protected video content.

6. The non-transitory machine readable medium of claim 5, wherein the plurality of elements includes a SWITCH element that describes alternative streams of protected video content for use in adaptive bitrate streaming.

7. The non-transitory machine readable medium of claim 5, wherein the plurality of elements includes an EXCL element to describe alternative streams of protected video content for use in conventional streaming.

8. The non-transitory machine readable medium of claim 5, wherein the URI references a container file and for each of the plurality of alternative streams of protected video content, one of the plurality of elements defines the size of a header section of the container file.

9. The non-transitory machine readable medium of claim 5, wherein one of the plurality of elements identifies the encoding of the stream of protected video content.

10. The non-transitory machine readable medium of claim 5, wherein one of the plurality of elements describing a stream of protected video content includes at least one element selected from the group consisting of:
   an element that describes a bitrate of a stream of protected video content;
   an element that describes the width and height of a protected stream of video content; and
   an element that describes a buffer size.

11. The non-transitory machine readable medium of claim 5, wherein the URI references a container file and, for each of the plurality of alternative streams of protected video content, one of the plurality of elements identifies the location of an index to the location of video chunks within the container file.

12. The non-transitory machine readable medium of claim 1, wherein the top level index file includes an index to the location of video track chunks within the container file of a stream of protected video content.

13. A playback device, comprising:
memory containing information describing the playback device; and
a processor configured by a client application; wherein the client application configures the processor to:
request a top level index file from a playback server, where the request identifies a piece of content and includes request information comprising device information describing the playback device and user information describing a user associated with the request;
receive a top level index file from the playback server, where the top level index file (i) describes at least a bitrate of each of a plurality of alternative streams of protected video content associated with the identified piece of content selected based upon the device information describing the playback device and an ability of the playback device to securely play back the protected video content, (ii) identifies the location of the each of the plurality of alternative streams of protected video content, where each of the plurality of alternative streams of protected video content encodes the piece of content at a different bitrate, and (iii) identifies common cryptographic information for accessing the protected video content;
select an initial stream of protected video content from the plurality of alternative streams of protected video content;
request at least a portion of the initial stream of protected video content from the location identified in the top level index file;
receive the requested at least a portion of the initial stream of protected content;
prior to receiving the requested at least a portion of the initial stream, request common cryptographic information to access the initial stream of protected video content from a digital rights management server;
receive the requested common cryptographic information, where the received common cryptographic information is encrypted;
access the received common cryptographic information securely;
decrypt the received portion of the initial stream of protected content using the common cryptographic information; and
play back the decrypted content.

14. The playback device of claim 13, wherein the plurality of alternative streams includes only streams that the playback device is capable of playing back.

15. The playback device of claim 13, wherein the device information includes information indicative of the geographic location of the playback device.

16. The playback device of claim 13, wherein the top level index file is a SMIL file.

17. The playback device of claim 13, wherein the top level index file describes each of the plurality of alternative streams of protected video content using a plurality of elements including a URI identifying the location of the stream of protected video content.

18. The playback device of claim 17, wherein the plurality of elements includes a SWITCH element that describes alternative streams of protected video content for use in adaptive bitrate streaming.

19. The playback device of claim 17, wherein the plurality of elements includes an EXCL element to describe alternative streams of protected video content for use in conventional streaming.

20. The playback device of claim 17, wherein the URI references a container file and for each of the plurality of alternative streams of protected video content, one of the plurality of elements defines the size of a header section of the container file.

21. The playback device of claim 17, wherein one of the plurality of elements identifies the encoding of the stream of protected video content.

22. The playback device of claim 17, wherein one of the plurality of elements describing a stream of protected video content includes at least one element selected from the group consisting of:
an element that describes a bitrate of a stream of protected video content;
an element that describes the width and height of a protected stream of video content; and
an element that describes a buffer size.

23. The playback device of claim 17, wherein the URI references a container file and, for each of the plurality of alternative streams of protected video content, one of the plurality of elements identifies the location of an index to the location of video chunks within the container file.

24. The playback device of claim 13, wherein the top level index file includes an index to the location of video track chunks within the container file of a stream of protected video content.

25. The playback device of claim 13, wherein the device information comprises at least one selected from the group consisting of playback capabilities of the playback device, a product identifier, a language associated with the playback device, a playback device type.

26. The playback device of claim 13, wherein the user information comprises user account information.

27. The playback device of claim 13, wherein accessing the received common cryptographic information comprises using device cryptographic information previously stored on the playback device.

28. The non-transitory machine readable medium of claim 1, wherein the device information comprises at least one selected from the group consisting of playback capabilities of the playback device, a product identifier, a language associated with the playback device, a playback device type.

29. The non-transitory machine readable medium of claim 1, wherein the user information comprises user account information.

30. The non-transitory machine readable medium of claim 1, wherein accessing the received common cryptographic information comprises using device cryptographic information previously stored on the playback device.

* * * * *

UNITED STATES PATENT AND TRADEMARK OFFICE
CERTIFICATE OF CORRECTION

PATENT NO. : 11,115,450 B2
APPLICATION NO. : 16/703668
DATED : September 7, 2021
INVENTOR(S) : Jason Braness, Evan Wallin and Ederson Ferreira It is certified that error appears in the above-identified patent and that said Letters Patent is hereby corrected as shown below:

In the Claims

Claim 1, Column 22, Line 6, "made by" should be changed to --using--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*